(12) United States Patent
Kirkley, Jr. et al.

(10) Patent No.: US 9,917,486 B2
(45) Date of Patent: Mar. 13, 2018

(54) ELECTRIC MOTOR ASSEMBLIES INCLUDING STATOR AND/OR ROTOR COOLING

(71) Applicant: Nidec Motor Corporation, St. Louis, MO (US)

(72) Inventors: Thomas E. Kirkley, Jr., Caseyville, IL (US); Lawrence J. Wittman, St. Charles, MO (US); Andrew F. Poag, St. Louis, MO (US); Steven P. Randall, Leeds (GB)

(73) Assignee: Nidec Motor Corporation, St. Louis, MO (US)

( * ) Notice: Subject to any disclaimer, the term of this patent is extended or adjusted under 35 U.S.C. 154(b) by 396 days.

(21) Appl. No.: 14/629,254

(22) Filed: Feb. 23, 2015

(65) Prior Publication Data

US 2015/0171699 A1 Jun. 18, 2015

Related U.S. Application Data

(63) Continuation of application No. 13/164,876, filed on Jun. 21, 2011, now Pat. No. 8,963,384.

(60) Provisional application No. 61/356,798, filed on Jun. 21, 2010, provisional application No. 61/454,352, filed on Mar. 18, 2011.

(51) Int. Cl.
| | |
|---|---|
| *H02K 1/32* | (2006.01) |
| *H02K 5/20* | (2006.01) |
| *H02K 3/24* | (2006.01) |
| *H02K 1/27* | (2006.01) |
| *H02K 7/08* | (2006.01) |
| *H02K 9/19* | (2006.01) |

(52) U.S. Cl.
CPC ............... *H02K 5/20* (2013.01); *H02K 1/32* (2013.01); *H02K 3/24* (2013.01); *H02K 1/2766* (2013.01); *H02K 7/083* (2013.01); *H02K 9/19* (2013.01)

(58) Field of Classification Search
CPC ............... H02K 1/32; H02K 3/24; H02K 5/20
USPC ................................................ 310/57–59
See application file for complete search history.

(56) References Cited

U.S. PATENT DOCUMENTS

| | | | | |
|---|---|---|---|---|
| 2008/0024020 A1* | 1/2008 | Iund | ................ | H02K 5/20 310/61 |
| 2011/0234029 A1* | 9/2011 | Pal | ................ | H02K 1/20 310/54 |
| 2011/0309697 A1* | 12/2011 | Kirkley, Jr. | ............ | H02K 1/32 310/54 |

* cited by examiner

Primary Examiner — Naishadh Desai
(74) Attorney, Agent, or Firm — Hovey Williams LLP

(57) ABSTRACT

An electric motor assembly including a stator having a stator core and windings around the stator core is disclosed. The stator core has opposing ends and an outer surface extending between the opposing ends. The electric motor assembly also includes a housing having an inner surface enclosing at least a portion of the stator, and at least one fluid passage between the outer surface of the stator core and the inner surface of the housing. The fluid passage permits a coolant in the fluid passage to contact one or more portions of the outer surface of the stator core to remove heat from the stator core during operation of the electric motor assembly. Additional motor assemblies including stator and/or rotor cooling features are disclosed.

23 Claims, 38 Drawing Sheets

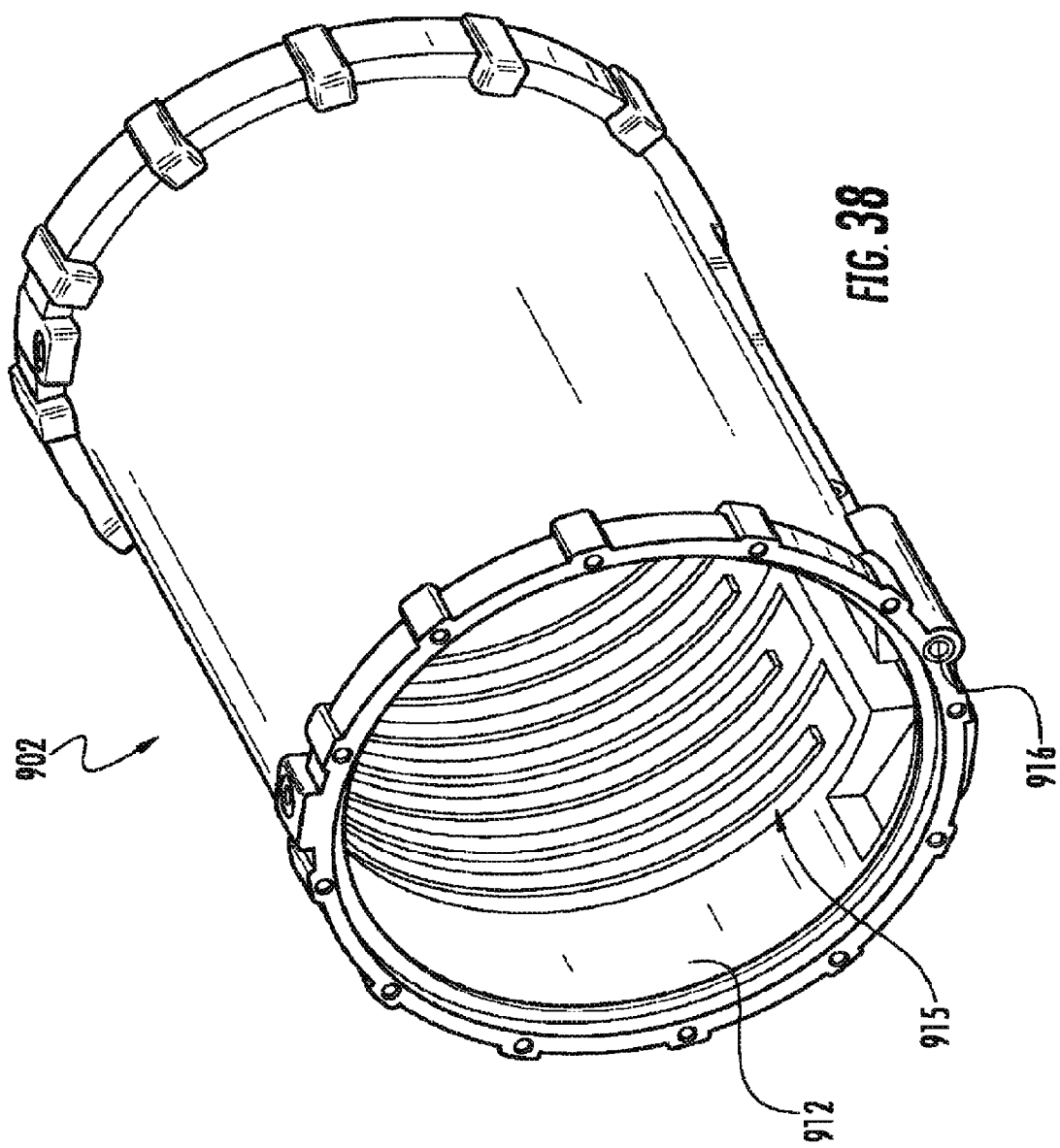

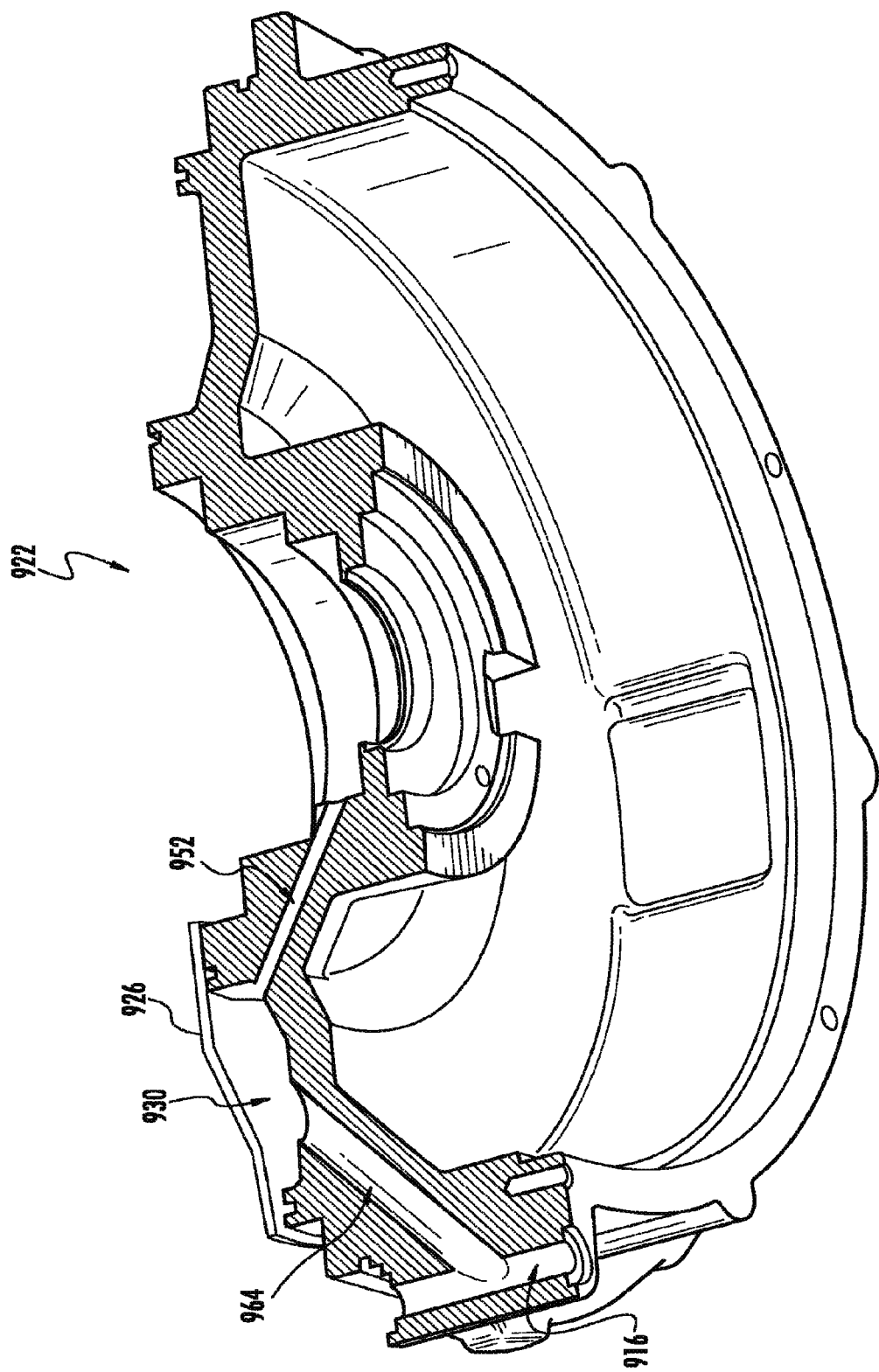

US 9,917,486 B2

ELECTRIC MOTOR ASSEMBLIES INCLUDING STATOR AND/OR ROTOR COOLING

CROSS-REFERENCE TO RELATED APPLICATIONS

The present application is a continuation of U.S. patent application Ser. No. 13/164,876, filed Jun. 21, 2011, which claims priority from U.S. Provisional Patent Application No. 61/356,798, filed Jun. 21, 2010, and U.S. Provisional Patent Application No. 61/454,352, filed Mar. 18, 2011. This application is related to U.S. patent application Ser. No. 13/194,588, filed Jul. 29, 2011. The entire disclosures of each of the above-referenced applications are hereby incorporated by reference herein.

FIELD

The present disclosure relates to electric motor assemblies. More particularly, the present disclosure relates to electric motor assemblies that include stator and/or rotor cooling.

BACKGROUND

This section provides background information related to the present disclosure which is not necessarily prior art.

Electric motors typically convert electrical energy to mechanical energy. In converting the electrical energy to mechanical energy, heat is commonly generated. This generated heat, if not properly dissipated from the motor, may degrade efficiency, damage the motor's components (including electrical windings, bearings, etc.), cause premature failure of the motor, etc.

Various cooling schemes, including fans, external cooling jackets, heat sinks, etc., have been used to attempt to cool electric motors and/or dissipate heat from electric motors.

SUMMARY

This section provides a general summary of the disclosure, and is not a comprehensive disclosure of its full scope or all of its features.

According to one aspect of the present disclosure, an electric motor assembly includes a stator including a stator core and windings around the stator core. The stator core has opposing ends and an outer surface extending between the opposing ends. The motor assembly further includes a housing having an inner surface enclosing at least a portion of the stator, and at least one fluid passage between the outer surface of the stator core and the inner surface of the housing. The fluid passage permits a coolant in the fluid passage to remove heat from the stator core during operation of the electric motor assembly. The fluid passage includes at least one flow disruptor to generate turbulence in the coolant as the coolant flows through the fluid passage.

According to another aspect of this disclosure, an electric motor assembly includes a stator including a stator core and windings around the stator core. The stator core has opposing ends and an outer surface extending between the opposing ends. The motor assembly further includes a housing having an inner surface enclosing at least a portion of the stator, and at least one fluid passage between the outer surface of the stator core and the inner surface of the housing. The fluid passage has a substantially S-shaped configuration. The fluid passage permits a coolant in the fluid passage to remove heat from the stator core during operation of the electric motor assembly.

According to a further aspect of this disclosure, an electric motor assembly includes a stator including a stator core and windings around the stator core. The stator core includes opposite first and second ends. The windings include end turns positioned at the first end of the stator core. The motor assembly further includes a housing enclosing at least a portion of the stator, and a wall positioned between an end of the housing and the stator. The wall includes at least one orifice for directing coolant on the end turns for removing heat from the end turns during operation of the electric motor assembly.

According to yet another aspect of this disclosure, an electric motor assembly includes a bearing, a longitudinally extending shaft coupled to the bearing, a rotor coupled to the shaft, a stator including a stator core and windings around the stator core, and a housing having an inner surface enclosing at least a portion of the stator and having an end shield. The stator core has opposing ends and an outer surface extending between the opposing ends. The windings include end turns positioned adjacent at least one of the opposing ends of the stator core. The motor assembly further includes a first fluid passage between the outer surface of the stator core and the inner surface of the housing, a wall positioned between the end shield and the stator, a fluid chamber between the end shield and the wall, and a second fluid passage connected in fluid communication with the fluid chamber for supplying coolant to the bearing to remove heat from the bearing and lubricate the bearing. The first fluid passage permits a coolant in the first fluid passage to remove heat from the stator core during operation of the electric motor assembly. The wall includes at least one orifice for directing coolant on the end turns for removing heat from the end turns during operation of the electric motor assembly. The fluid chamber is connected in fluid communication with the first fluid passage for supplying coolant to the at least one orifice.

According to still another aspect of this disclosure, an electric motor assembly includes a longitudinally extending shaft, and a rotor coupled to the shaft. The rotor has at least one internal fluid passage extending longitudinally from a first end of the rotor to a second end of the rotor. The motor assembly further includes an end plate coupled to the first end of the rotor. The end plate includes at least one fluid port in fluid communication with the at least one internal fluid passage of the rotor, and an impeller for drawing coolant into the fluid port and through the at least one internal fluid passage of the rotor when the rotor, the shaft and the end plate are rotated during operation of the electric motor assembly.

According to still another aspect of this disclosure, an electric motor assembly capable of being cooled with a coolant is provided. The motor assembly comprises a rotor rotatable about an axis, a stator including a stator core and windings wound about the stator core, a housing enclosing at least a portion of the stator, and at least one orifice for directing coolant. The stator core includes opposite first and second ends spaced along the axis. The stator core presents an outer surface extending between the ends. The windings include end turns positioned at the first end of the stator core. The housing includes an inner surface that cooperates with the outer surface of the stator core to define a stator cooling passage through which coolant flows to remove heat from the stator core during operation of the assembly. The at least one orifice is for directing coolant onto the end turns for removing heat from the end turns during operation of the assembly. The at least one orifice is in fluid communication with the stator-cooling passage.

Further aspects and areas of applicability will become apparent from the description provided herein. It should be understood that various aspects of this disclosure may be implemented individually or in combination with one or more other aspects, and in combination with one or more other elements or features described herein and/or illustrated in the drawings. It should also be understood that the description and specific examples in this disclosure are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 38 is a top left isometric view of the housing of FIG. 37.

FIG. 39 is a cutaway right isometric view of the electric motor assembly of FIG. 36.

Corresponding reference numerals indicate corresponding parts throughout the several views of the drawings.

DETAILED DESCRIPTION

Figure 1:
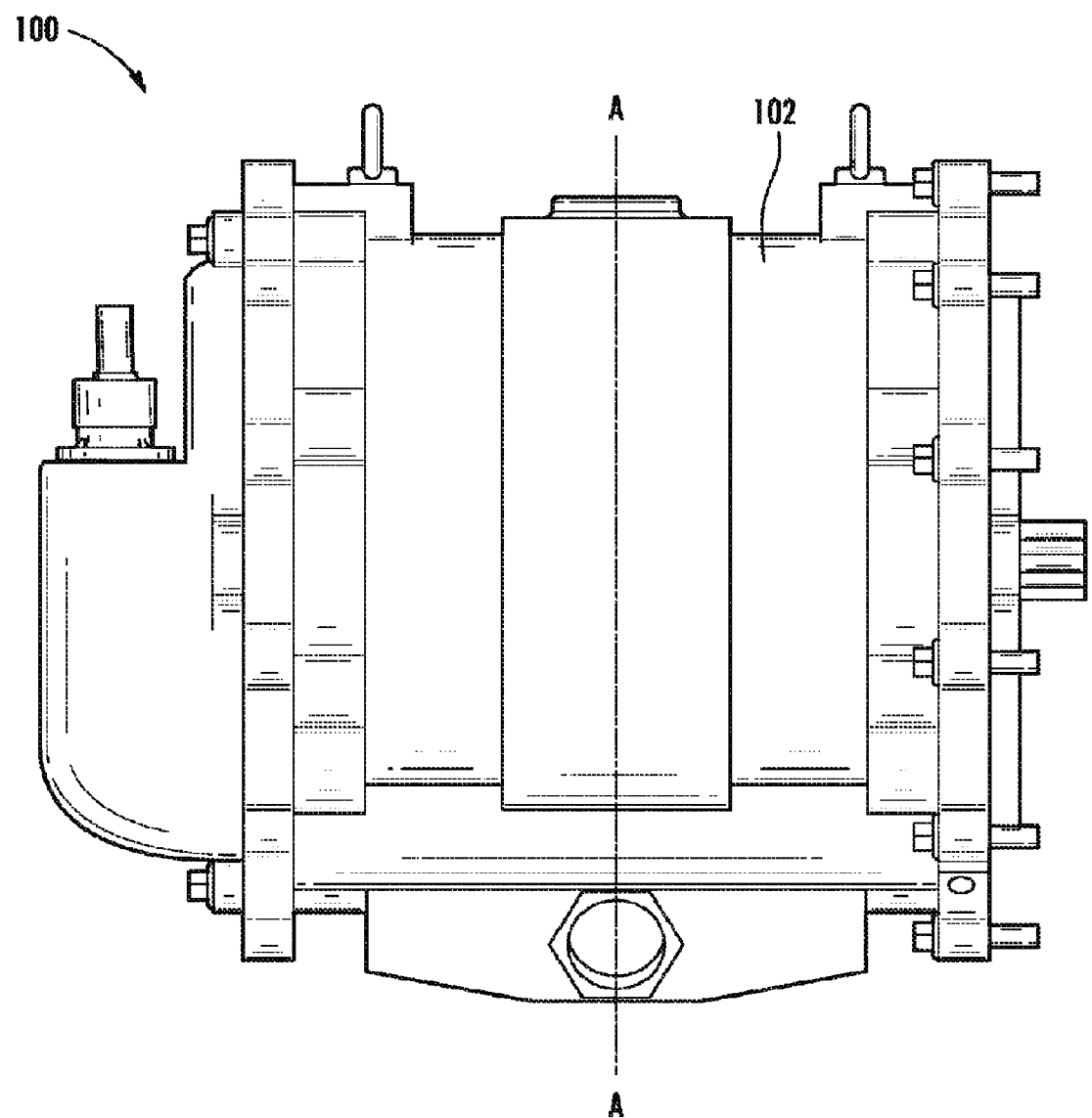
FIG. 1 is a side view of an example electric motor assembly according to aspects of this disclosure.
Figure 2:
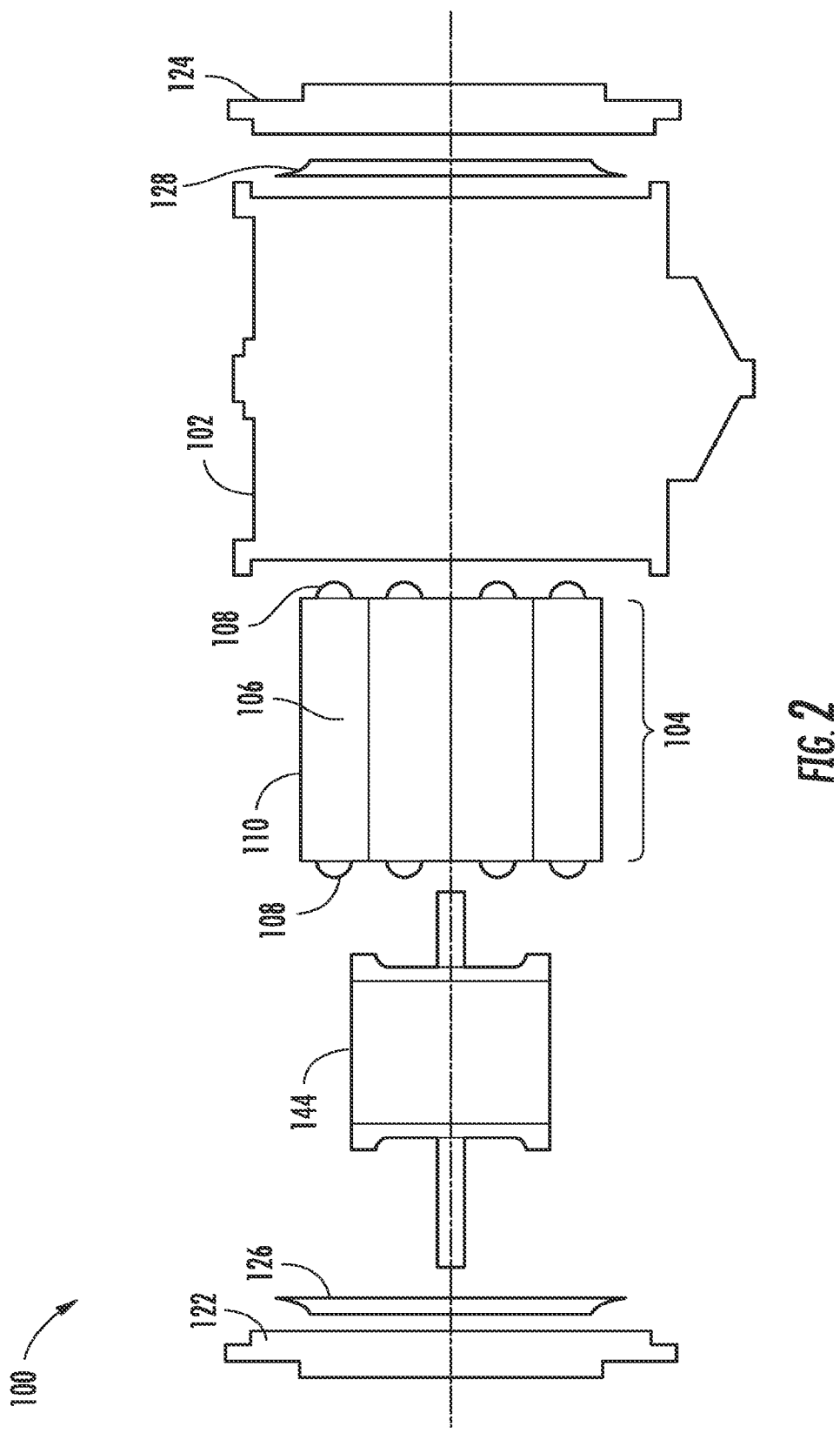
FIG. 2 is an exploded side view of the example electric motor assembly of FIG. 1.
Figure 3:
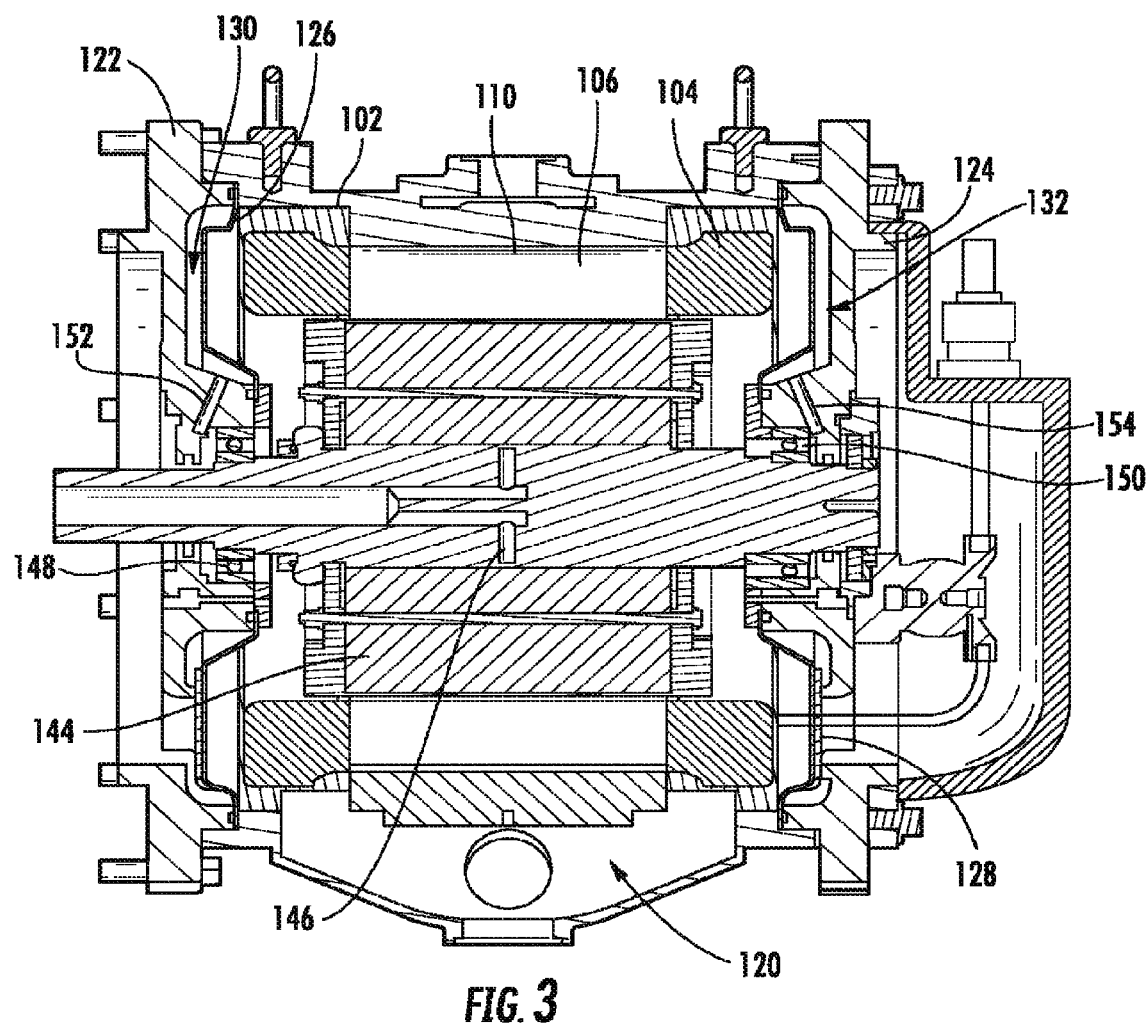
FIG. 3 is a cutaway side view of the example electric motor assembly of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, an electric motor assembly includes a stator having a stator core and windings around the stator core. The stator core has opposing ends and an outer surface extending between the opposing ends. The electric motor assembly also includes a housing having an inner surface enclosing at least a portion of the stator, and at least one fluid passage between the outer surface of the stator core and the inner surface of the housing. The fluid passage permits a coolant in the fluid passage to remove heat from the stator core during operation of the electric motor assembly. The fluid passage includes at least one flow disruptor to generate turbulence in the coolant as the coolant flows through the fluid passage.

The fluid passage may permit coolant in the fluid passage to contact one or more portions of the outer surface of the stator. Alternatively, coolant in the fluid passage may be separated from the outer surface of the stator by, for example, a thermally conductive fluid passage wall, etc.

The stator core may be constructed by any suitable manner of construction. For example, the stator may include a plurality of stator lamination having outer edges. The fluid passage may be configured to permit a coolant in the fluid passage to contact one or more outer edges.

The housing may include a fluid inlet and a fluid outlet in fluid communication with the fluid passage. The housing may include a fluid collection area adjacent the fluid outlet. The fluid collection area and the fluid outlet may be positioned below the stator.

The fluid passage may have an S-shaped configuration. Alternatively, the fluid passage may have another configuration, including, for example, a straight, spiral or rectangular configuration. The fluid passage may have a symmetrical configuration or a non-symmetrical configuration.

The fluid passage may extend along a central portion of the stator core. Alternatively, or additionally, the fluid passage may extend along a portion of the stator core that is not a central portion, including, for example, one or more portions alongside a central portion of the stator core.

The assembly may include two fluid passages between the outer surface of the stator core and the inner surface of the housing. Each fluid passage may permit a coolant therein to contact one or more portions of the outer surface of the stator core for removing heat from the stator core during operation of the electric motor assembly. The two fluid passages may extend around opposite sides of the stator core. The assembly may also include more than two such fluid passages between the outer surface of the stator core and the inner surface of the housing.

One or more portions of the housing inner surface may engage the outer surface of the stator core. The housing inner surface may have a recessed channel extending therein. The outer surface of the stator core and the recessed channel of the housing inner surface may define the at least one fluid passage.

The stator windings may include end turns. The electric motor assembly may further include at least one orifice for spraying coolant on the end turns during operation of the electric motor assembly.

The assembly may include a rotor having at least one fluid passage extending along or through the rotor. The rotor fluid passage may permit a coolant therein to contact one or more portions of the rotor for removing heat from the rotor during operation of the electric motor assembly.

The assembly may include an end plate coupled to an end of the rotor. The end plate may include at least one fluid port in fluid communication with the rotor fluid passage. The end plate may include an impeller (sometimes referred to as a fan) that rotates with the rotor assembly for drawing coolant into the fluid port and through the rotor fluid passage when the rotor and the end plate are rotated during operation of the electric motor assembly.

According to another aspect of the present disclosure, an electric motor assembly includes a stator having a stator core and windings around the stator core. The stator core has opposing ends and an outer surface extending between the opposing ends. The electric motor assembly also includes a housing having an inner surface enclosing at least a portion of the stator, and at least one fluid passage between the outer surface of the stator core and the inner surface of the housing. The fluid passage has an S-shaped configuration.

The fluid passage permits a coolant in the fluid passage to remove heat from the stator core during operation of the electric motor assembly.

The fluid passage may include a flow disruptor to generate turbulence in the coolant as the coolant flows through the fluid passage.

The fluid passage may permit coolant in the fluid passage to contact one or more portions of the outer surface of the stator to remove heat from the stator core during operation of the electric motor assembly.

The stator core may be constructed by any suitable manner of construction. For example, the stator may include a plurality of stator lamination having outer edges. The fluid passage may be configured to permit a coolant in the fluid passage to contact one or more outer edges.

The housing may include a fluid inlet and a fluid outlet in fluid communication with the fluid passage. The housing may include a fluid collection area adjacent the fluid outlet. The fluid collection area and the fluid outlet may be positioned below the stator. The fluid passage may have a symmetrical configuration or a non-symmetrical configuration. In any given embodiment, portions of the housing that surround the fluid passage may contact and support the outer surface of the stator 104. Preferably, the contacting portions are spaced around the circumference of each section of the stator. As a result, the housing contacts and supports the outer surface of the stator in multiple locations about the circumference of the stator along the entire length of the stator.

Preferably, the fluid passage extends between the opposite ends of the stator for removing heat along the entire length of the stator. Alternatively, the fluid passage may extend along only a central (or other) portion of the stator core.

The assembly may include two fluid passages between the outer surface of the stator core and the inner surface of the housing. Each fluid passage may permit a coolant therein to contact one or more portions of the outer surface of the stator core for removing heat from the stator core during operation of the electric motor assembly. The two fluid passages may extend around opposite sides of the stator core. The assembly may also include more than two such fluid passages between the outer surface of the stator core and the inner surface of the housing.

One or more portions of the housing inner surface may engage the outer surface of the stator core. The housing inner surface may have a recessed channel extending therein. The outer surface of the stator core and the recessed channel of the housing inner surface may define the at least one fluid passage.

The stator windings may include end turns. The electric motor assembly may further include at least one orifice for spraying coolant on the end turns during operation of the electric motor assembly.

The assembly may include a rotor having at least one fluid passage extending along or through the rotor. The rotor fluid passage may permit a coolant therein to contact one or more portions of the rotor for removing heat from the rotor during operation of the electric motor assembly.

The assembly may include an end plate coupled an end of the rotor. The end plate may include at least one fluid port in fluid communication with the rotor fluid passage. The end plate may include an impeller for drawing coolant into the fluid port and through the rotor fluid passage when the rotor and the end plate are rotated during operation of the electric motor assembly.

According to another aspect of the present disclosure, an electric motor assembly includes a stator including a stator core and windings around the stator core. The stator core includes opposite first and second ends. The windings include end turns positioned at the first end of the stator core. The assembly includes a housing enclosing at least a portion of the stator. The assembly also includes a wall positioned between the housing and the stator. The wall includes at least one orifice for directing coolant on the end turns for removing heat from the end turns during operation of the electric motor assembly.

The orifice may be adapted to spray coolant on the end turns during operation of the electric motor assembly. The orifice may be adapted to spray coolant on one or more different portions of the end turns. For example, the orifice may be adapted to spray coolant on an outer side of the end turns during operation of the electric motor assembly. Alternatively, or additionally, the orifice may be adapted to spray coolant on an inner side of the end turns during operation of the electric motor assembly. Alternatively, or additionally, the orifice may be adapted to spray coolant on a face of the end turns during operation of the electric motor assembly. The assembly may include a plurality of orifices for directing coolant on an outer side, an inner side and a face of the end turns during operation of the electric motor assembly.

The windings may include end turns positioned at the second end of the stator core, and the assembly may include at least one orifice for directing coolant on the end turns positioned at the second end of the stator core for removing heat therefrom during operation of the electric motor assembly. The orifice may be adapted to spray coolant on one or more different portions of the end turns (e.g., an inner side, an outer side, a face, etc.). The assembly may include a plurality of orifices for directing coolant on an outer side, an inner side and a face of the end turns positioned at the second end of the stator core.

The housing may include an end shield and the wall may be positioned between the end shield and the stator. The assembly may include a plurality of orifices for directing coolant on the end turns during operation of the electric motor assembly. The plurality of orifices may be positioned on the wall. The wall may be contoured.

The assembly may also include a fluid chamber between the end shield and the wall for supplying coolant to the at least one orifice. The assembly may include at least one fluid passage between the outer surface of the stator core and an inner surface of the housing. The fluid passage permits a coolant in the fluid passage to contact one or more portions of the outer surface of the stator core for removing heat from the stator core during operation of the electric motor assembly. The fluid passage is connected in fluid communication with the fluid chamber between the end shield and the wall.

The housing may include a fluid inlet and a fluid outlet in fluid communication with the at least one orifice. The housing may include a fluid collection area adjacent the fluid outlet. The fluid collection area and the fluid outlet may be positioned below the stator.

The assembly may include a rotor having at least one fluid passage extending along or through the rotor. The rotor fluid passage permits a coolant therein to contact one or more portions of the rotor for removing heat from the rotor during operation of the electric motor assembly.

According to another aspect of the present disclosure, an electric motor assembly includes a longitudinally extending shaft, and a rotor coupled to the shaft. The rotor includes at least one internal fluid passage extending longitudinally from a first end of the rotor to a second end of the rotor. The assembly includes an end plate coupled to the first end of the rotor. The end plate includes at least one fluid port in fluid communication with the at least one internal fluid passage of the rotor, and an impeller for drawing coolant into the fluid port and through the at least one internal fluid passage of the rotor when the rotor, the shaft and the end plate are rotated during operation of the electric motor assembly.

The rotor may include more than one internal fluid passages. For example, the rotor may include a plurality of internal fluid passages extending longitudinally from a first end of the rotor to a second end of the rotor.

The end plate may include a plurality of fluid ports each in fluid communication with at least one of the internal fluid passages of the rotor.

The end plate may include an impeller for drawing coolant into the fluid ports and through the internal fluid passages when the rotor, the shaft and the end plate are rotated.

According to another aspect of the present disclosure, an electric motor assembly includes a longitudinally extending shaft coupled to a bearing and a rotor coupled to the shaft. The assembly includes a stator including a stator core and windings around the stator core. The stator core has opposing ends and an outer surface extending between the opposing ends. The assembly includes a housing having an inner surface enclosing at least a portion of the stator and having an end shield. The assembly includes at least one fluid passage between the outer surface of the stator core and the inner surface of the housing. The fluid passage permits a coolant in the fluid passage to remove heat from the stator core during operation of the electric motor assembly. The assembly includes a wall positioned between the end shield and the stator. The wall includes at least one orifice for directing coolant on the end turns for removing heat from the end turns during operation of the electric motor assembly. The assembly includes a fluid chamber between the end shield and the wall. The fluid chamber is connected in fluid communication with the fluid passage for supplying the coolant to the at least one orifice. The assembly includes a fluid passage connected in fluid communication with the fluid chamber for supplying the coolant to the bearing to remove heat from the bearing and lubricate the bearing.

The assembly may include a bearing cap adjacent the bearing. The bearing cap may include at least one orifice and the bearing cap orifice may be in fluid communication with the fluid chamber for directing the coolant to the rotor for removing heat from the rotor during operation of the electric motor assembly.

The rotor may include at least one internal fluid passage extending longitudinally from a first end of the rotor to a second end of the rotor. The assembly may include an end plate coupled to the first end of the rotor. The end plate may include at least one fluid port in fluid communication with the at least one internal fluid passage of the rotor. The end plate may include an impeller for drawing the coolant and air into the fluid port and through the at least one internal fluid passage of the rotor when the rotor, the shaft and the end plate are rotated during operation of the electric motor assembly.

The housing may include a fluid inlet and a fluid outlet in fluid communication with the fluid passage. The fluid collection area and the fluid outlet may be positioned below the stator.

The various aspects discussed herein may be employed individually or in combination, and may be incorporated in various types of electric motors including, for example, permanent magnet motors, switched reluctance motors, etc. Exemplary embodiments of electric motor assemblies and components (e.g., various rotors, end plates, housings, etc.) will be discussed with reference to FIGS. 1-39. It should be understood, however, that other motor assemblies, components, etc. may be used to embody the aspects disclosed herein without departing from the scope of this disclosure.

An example electric motor assembly, generally indicated by reference numeral 100, according to one or more aspects of the present disclosure will be described with reference to FIGS. 1-8.

The assembly 100 includes a housing 102 and a stator 104. The stator 104 includes a stator core 106 with windings having end turns 108 around the stator core 106. The stator core includes an outer surface 110. In the particular example of FIG. 1, the motor assembly 100 is an internal permanent magnet (IPM) motor with permanent magnets imbedded in the stator core 106.

Figure 4:
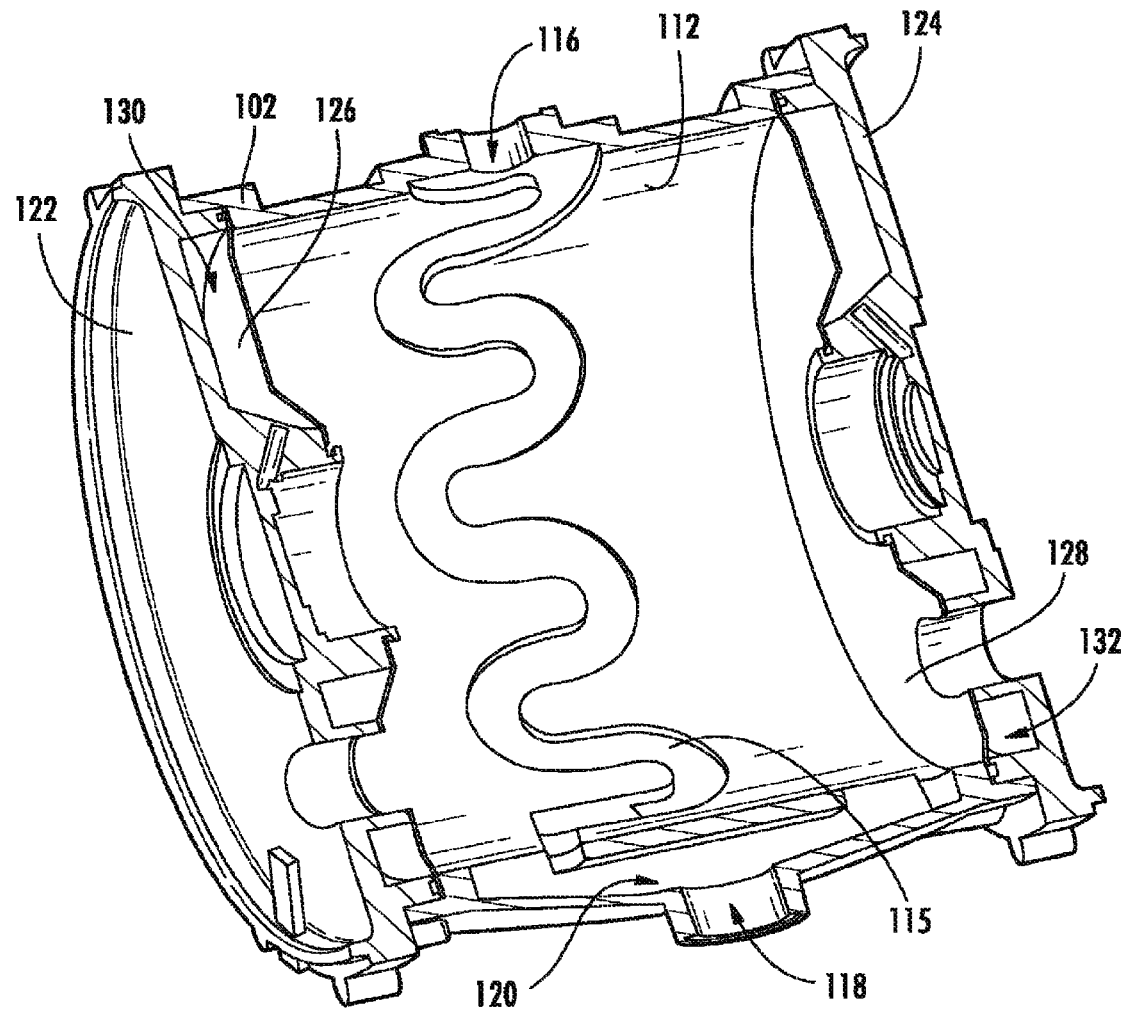
FIG. 4 is a bottom rear isometric cutaway view of the example electric motor assembly of FIG. 1 with the rotor and shaft removed.
Figure 5:
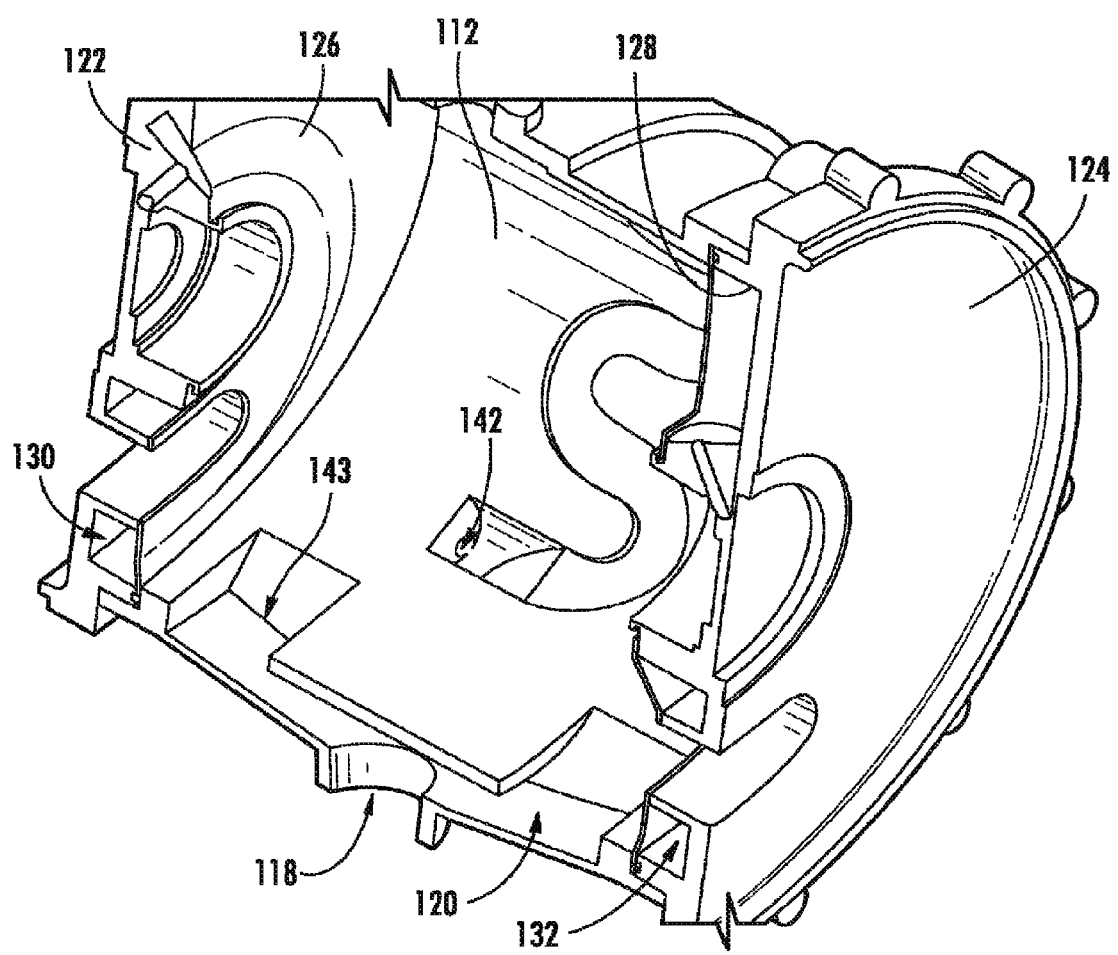
FIG. 5 is a top right isometric cutaway view of the example electric motor assembly of FIG. 1 with the rotor and shaft removed.

The housing 102 includes an inner surface 112 (best seen in FIGS. 4 and 5). The inner surface 112 encloses the stator 104. Although the illustrated inner surface 112 encloses all of the stator 104, the housing 102 may include an inner surface 112 that encloses less than all of the stator 104.

The inner surface 112 of the housing 102 engages (e.g., contacts, couples with, is connected to, etc.) the outer surface 110 of the stator core 106. A fluid passage 114 is cooperatively defined by the outer surface 110 of the stator core 106 and a recessed channel 115 in the inner surface 112 of the housing 102. The fluid passage 114 permits a coolant (not illustrated) in the fluid passage 114 to contact portions of the outer surface 110 of the stator core 106 to remove heat from the stator core 106 during operation of the electric motor assembly 100.

The coolant may be any suitable fluid for transferring heat. The coolant may be, for example, oil, air, a mixture of oil and air, etc.

The illustrated recessed channel 115, and accordingly the fluid passage 114, is generally S-shaped traversing circumferentially and axially around at least part of the housing 102 along a central portion of the stator core 106. The fluid passage 114 may traverse around the entire circumference of the housing 102, or may traverse less than the entire circumference of the housing 102. Additionally, the fluid passage 114 may be oriented along the axial length of the housing 102 (e.g., rotated ninety degrees from the orientation shown in FIG. 4). The fluid passage 114 may be located offset from a central portion of the stator core 106. Alternatively, or additionally, the fluid passage 114 may traverse the housing both circumferentially and axially (i.e., lengthwise), with no particular direction (e.g., random, meandering, etc.), etc. Additionally, the fluid passage 114 may have any suitable shape, including serpentine and non-serpentine shapes. The fluid passage 114 may be symmetrical, asymmetrical, a combination of symmetrical and asymmetrical, etc. Additionally, or alternatively, the assembly 100 may include more than one fluid passage 114. For example, in the embodiment shown in FIG. 4, there is a first fluid passage 114 on one half of the housing 102, and a second fluid passage (not shown) on the other half of the housing 102. Collectively, these two fluid passages extend around both sides of the stator core 106. In some embodiments, the overall width of the recessed channel 115 is slightly less than the axial length of the stator core 106. As a result, the channel 115 winds back and forth between the opposite ends of the stator core 106 for removing heat along the entire axial length of the stator core 106.

The stator 104 is a laminated stator. The stator core 106 is constructed of a plurality of stator laminations (not separately illustrated) laminated together. The stator laminations have outer edges (which cooperatively form at least part of the outer surface 110 of the stator core 106). The fluid passage 114 is configured to permit coolant in the fluid passage 114 to contact the outer edges of the stator laminations.

The assembly 100 includes a fluid inlet 116 in fluid communication with the fluid passage 114. The assembly 100 also includes a fluid outlet 118 in fluid communication with the fluid passage 114. A fluid collection area 120 is located adjacent the fluid outlet 118. The fluid outlet 118 and the fluid collection area 120 are located below the stator 104.

During operation of the electric motor assembly 100, coolant enters the assembly 100 through the fluid inlet 116 and flows through the fluid passage 114 toward the fluid outlet 118. While flowing in the fluid passage 114, the coolant is in direct contact with the outer surface 110 of the stator core 106. More particularly, the coolant is in direct contact with the stator laminations. Heat is transferred by this contact from the stator core 106 to the coolant. Generally, the coolant exits the fluid passage 114 through the fluid outlet 118. Some of the coolant may be directed elsewhere in the assembly 100 instead of exiting the fluid outlet 118, as will be discussed below. The coolant that exits the fluid outlet 118 is returned to the fluid inlet 116. During the recirculation to the fluid inlet 116, the coolant may be processed with at least one heat exchanger to release at least some of the heat the coolant received from the stator core 106. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

Figure 6:
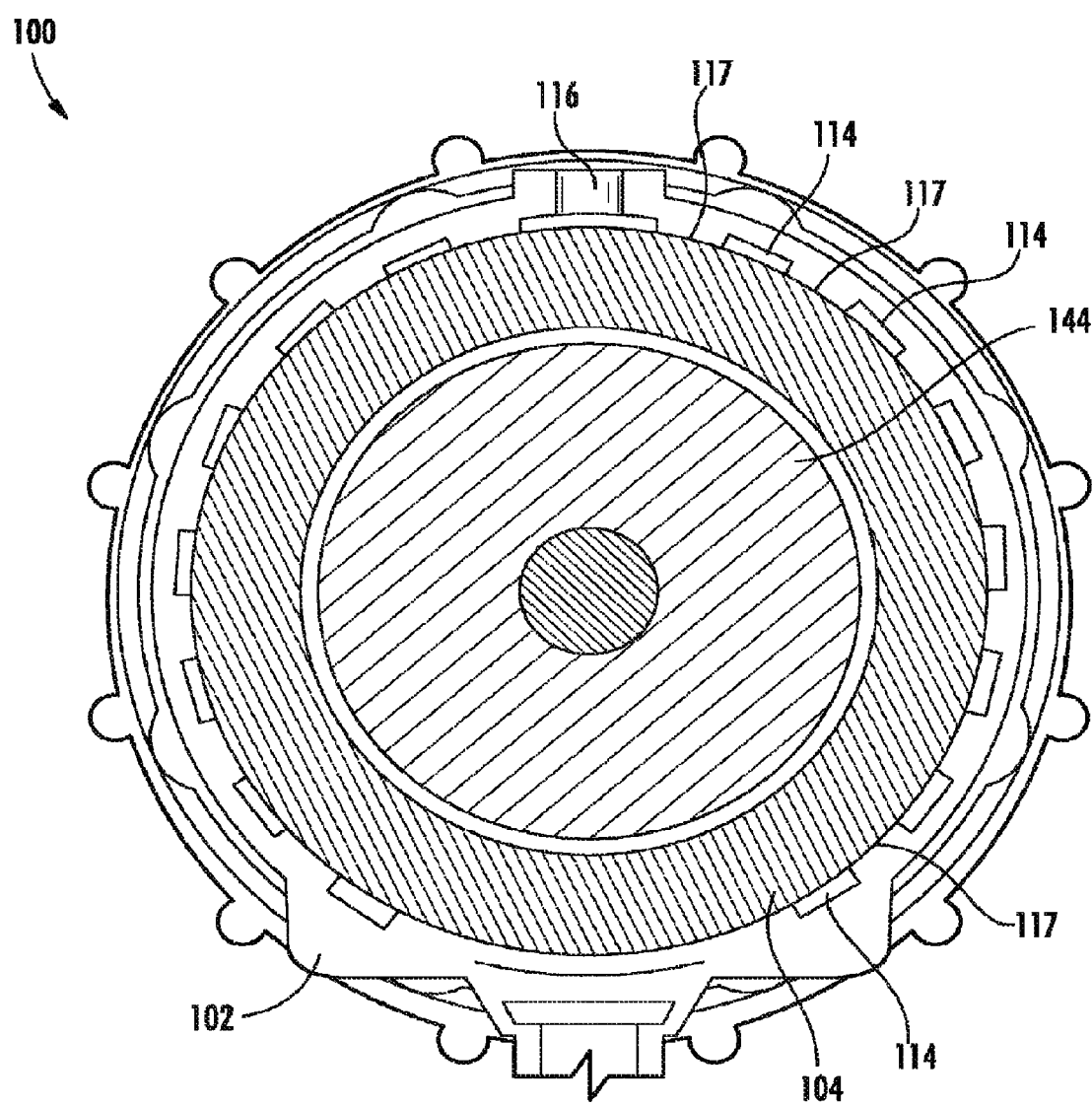
FIG. 6 is a cutaway end view of the example electric motor assembly of FIG. 1.
Figure 7:
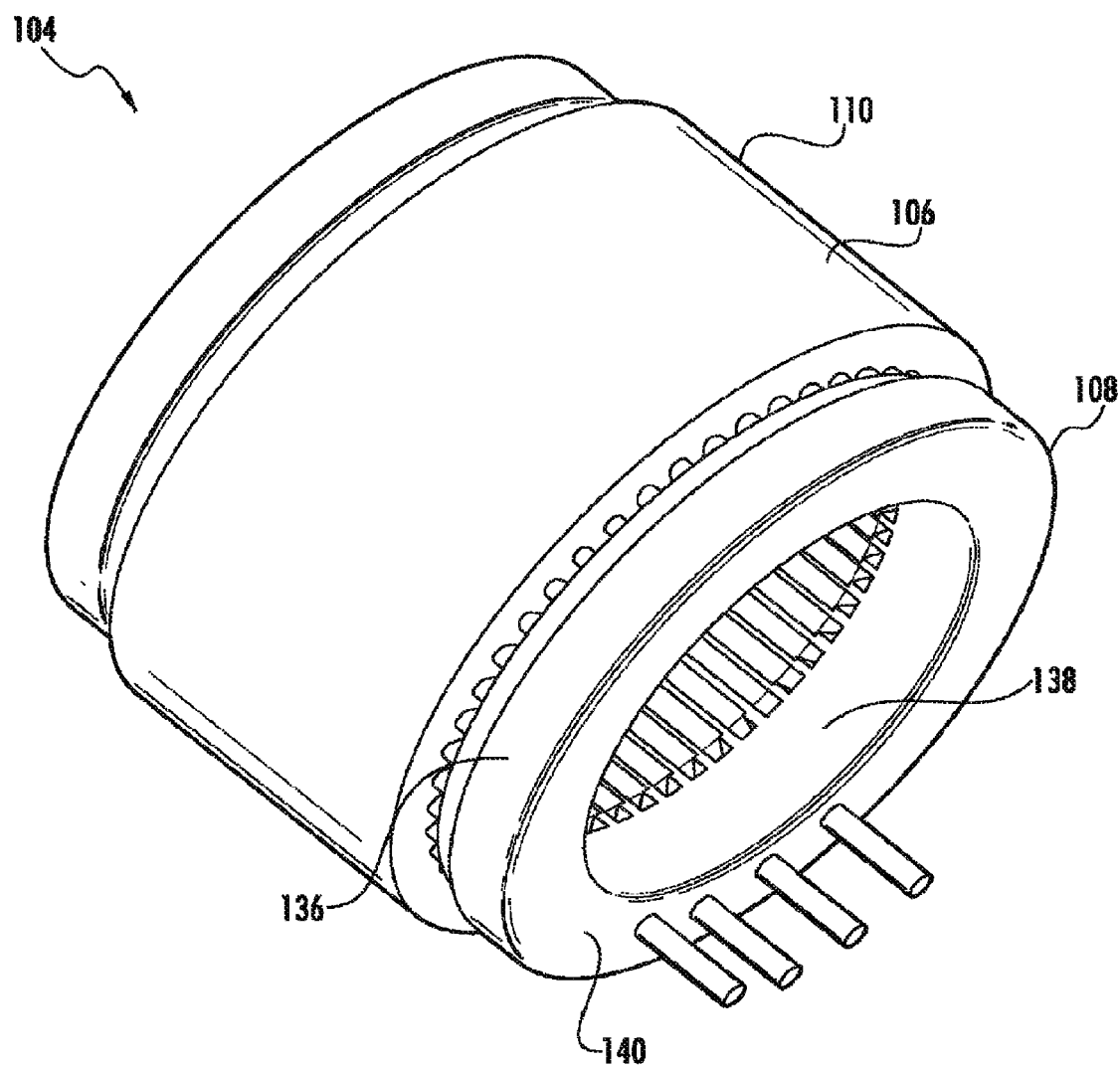
FIG. 7 is a close-up view of a portion of the stator of example electric motor assembly of FIG. 1.

As shown in FIG. 6, portions 117 of the housing 102 that surround the fluid passage 114 contact and support the outer surface of the stator 104. Preferably, the contacting portions 117 are evenly spaced around almost the entire circumference of the stator 104. While FIG. 6 illustrates a cross sectional view through one portion of the stator 104, it should be understood that similar portions of the housing 102 are evenly spaced around the circumference of other portions of the stator. As a result, the housing contacts and supports the outer surface of the stator in multiple locations about the circumference of the stator along the entire length of the stator.

Figure 8:
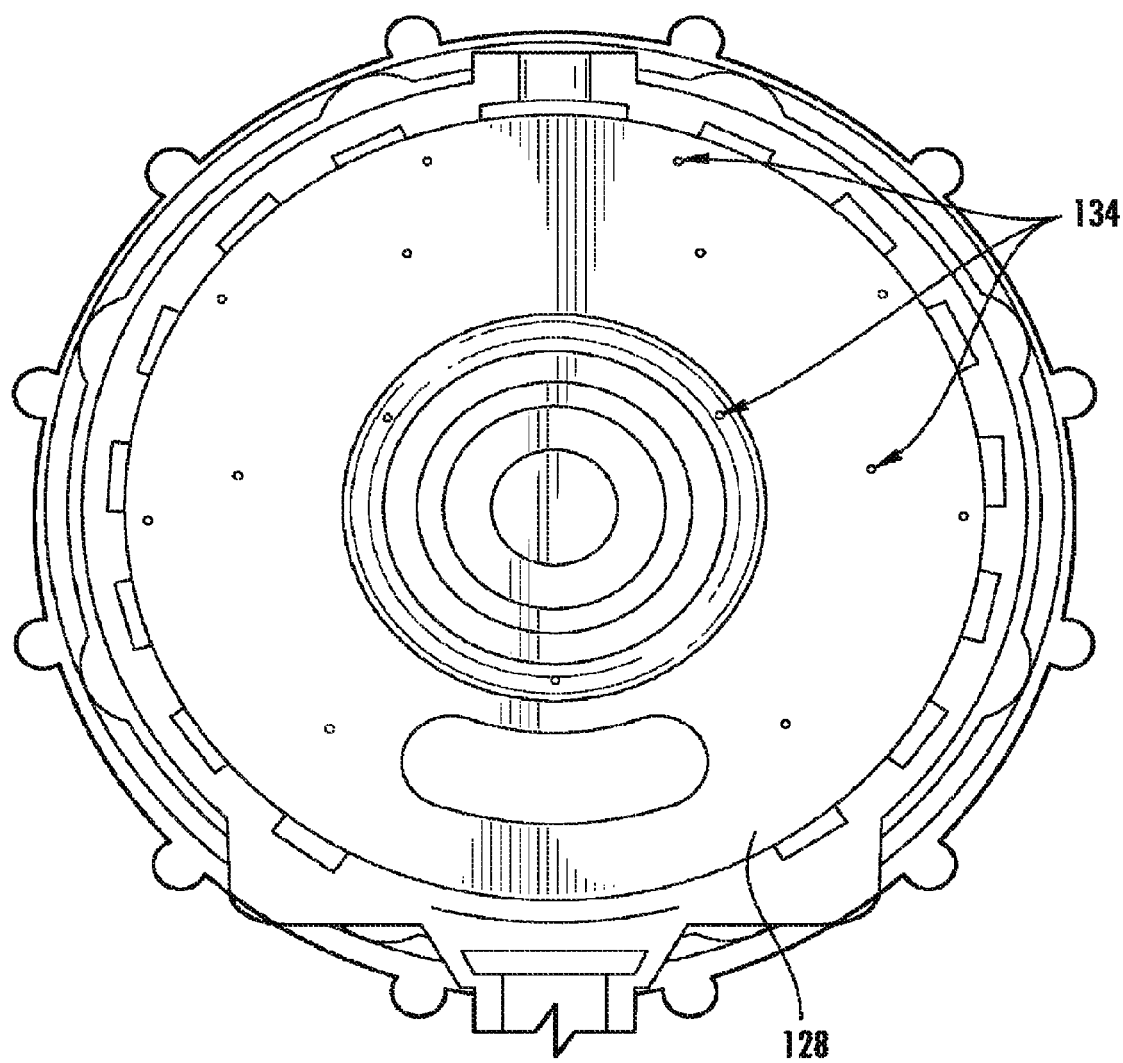
FIG. 8 is a cutaway end view of the example electric motor assembly of FIG. 1 with the rotor and shaft removed.

The assembly 100 includes a first end shield 122 and a second end shield 124. A first wall 126 is positioned between the first end shield 122 and the stator 104. A second wall 128 is positioned between the second end shield 124 and the stator 104. The first wall 126 and the first end shield 122 cooperatively define a first fluid chamber 130 and the second wall 128 and the second end shield 124 cooperatively define a second fluid chamber 132. Each of the first and second walls 126, 128 includes a plurality of orifices 134 (e.g., holes, slots, openings, etc.). The walls 126, 128 may include more or fewer orifices 134 than are illustrated in FIG. 8 and/or the configuration of orifices 134 may differ.

In operation of the assembly 100, coolant flows into the first and second fluid chambers 130, 132 and through the orifices 134. The orifices 134 are configured (e.g., shaped, sized, aimed, etc.) to direct the coolant onto the end turns 108 of the stator 104 to remove heat from the end turns 108. The orifices 134 may be configured to spray coolant on an outer side 136 of the end turns 108, on an inner side 138 of the end turns 108, and/or on a face 140 of the end turns 108.

The coolant to be sprayed by the orifices 134 is some of the same coolant that flows through the fluid passage 114. As discussed above, coolant flows through the fluid passage 114 toward the fluid outlet 118. Most of the coolant exits the fluid passage 114 through the fluid collection area 120 and the fluid outlet 118. Some or all of the coolant, however, is diverted into a transfer port 142 located near the fluid outlet 118. The transfer port 142 is in fluid communication with at least one of the fluid chambers 130, 132. For example, the transfer port 142 illustrated in FIG. 5 transfers coolant to the first fluid chamber 130. A similar transfer port 142 on the other half of the housing 102 will provide coolant to the second fluid chamber 132. Alternatively, a single transfer port (and/or more than two transfer ports) may provide coolant to both fluid chambers 130, 132. Similarly, more than one transfer port may provide coolant to a single fluid chamber 130, 132. Alternatively, or additionally, coolant may be provided to the first and second fluid chambers 130, 132 separately from the coolant in the fluid passage 114.

Coolant sprayed onto the end turns 108 drips, splashes, etc. off the end turns 108 and is collected by drainage ports 143. The drainage ports 143 direct the coolant into the fluid collection area 120. Alternatively, or additionally, coolant sprayed by the orifices 134 may be collected separately from coolant passed through the fluid passage 114.

The coolant is forcefully circulated through the assembly 100 (and more particularly, through the fluid passage 114, transfer port 142, etc.) using pressure. The pressure and speed of the coolant may be varied to achieve desired cooling, desired spray from the orifices 134, etc. Alternatively, or additionally, the coolant may be circulated by any other suitable means (including, e.g., by gravity).

The cooling features discussed above are generally directed to cooling the stator 104. The assembly 100 may also include features generally directed to cooling a rotor 144. For example, the rotor 144 includes a fluid passage 146 extending through part of the rotor 144. Coolant may travel through the fluid passage 146 to contact one or more portions of the rotor 144 to remove heat from the rotor 144 during operation of the assembly 100. Other suitable rotors, including rotors without a fluid passage 146, rotors according to other embodiments discussed herein, etc., may be used in the assembly 100 without departing from the scope of this disclosure.

The assembly 100 includes first and second bearings 148, 150. The first end shield 122 includes a first fluid passage 152 connected in fluid communication with the first fluid chamber 130 for supplying coolant to the first bearing 148 to remove heat from the first bearing 148 and lubricate the first bearing 148. The second end shield 124 includes a second fluid passage 154 connected in fluid communication with the second fluid chamber 132 for supplying coolant to the second bearing 150 to remove heat from the second bearing 150 and lubricate the second bearing 150.

Figure 9:
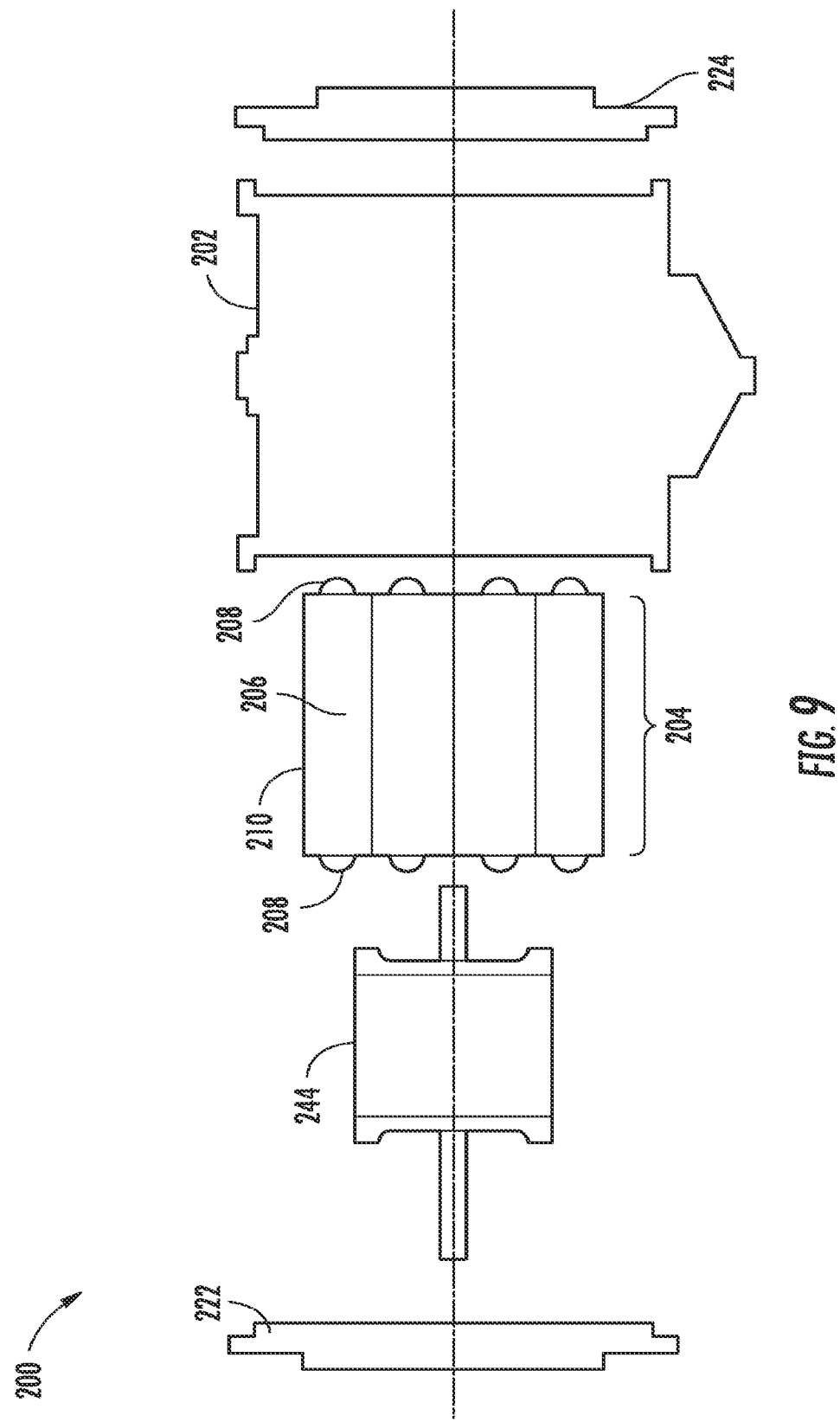
FIG. 9 is an exploded side view of another example electric motor assembly according to at least one aspect of the present disclosure.
Figure 10:
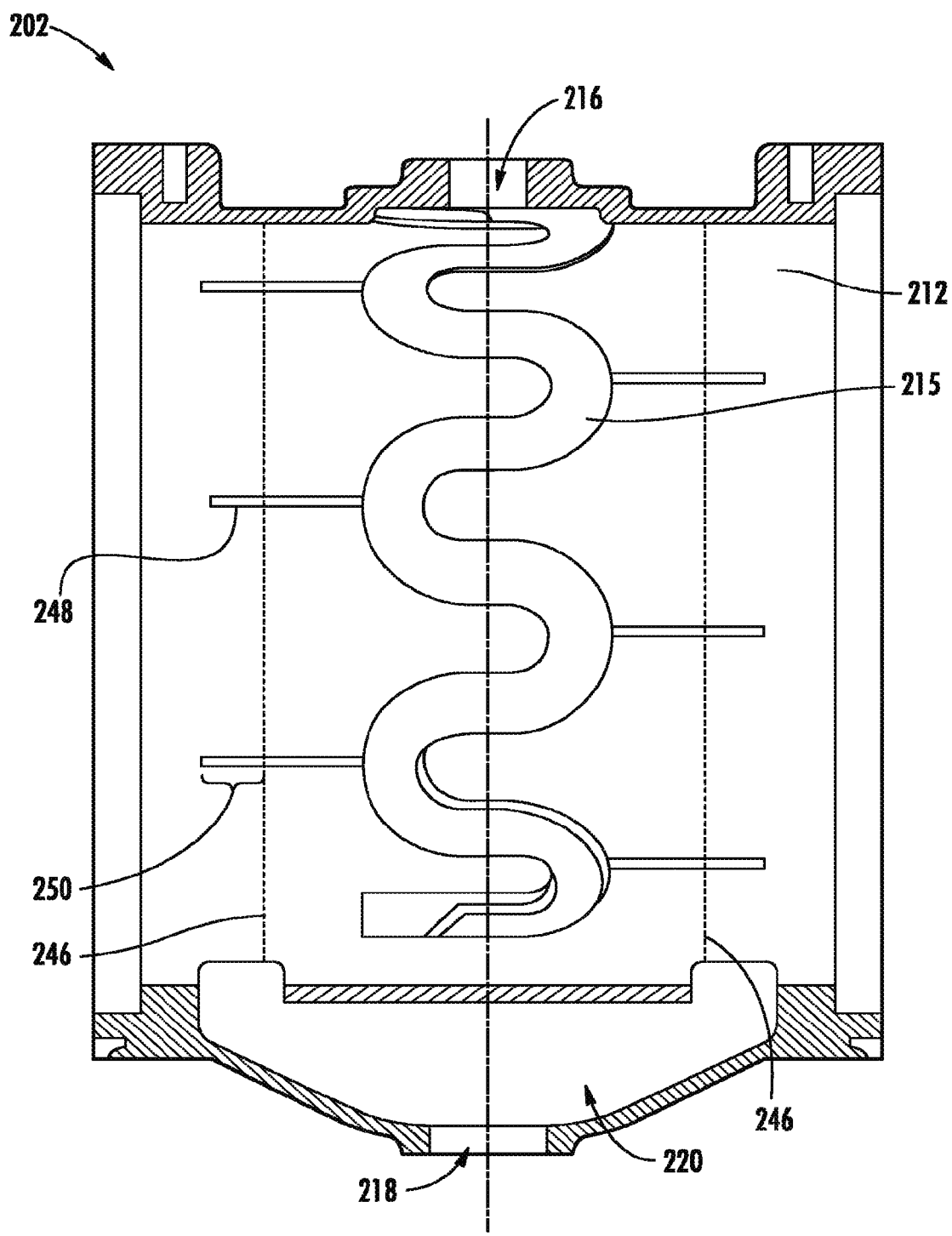
FIG. 10 is a cutaway side view of the example electric motor assembly of FIG. 9 with the rotor and shaft removed.
Figure 11:
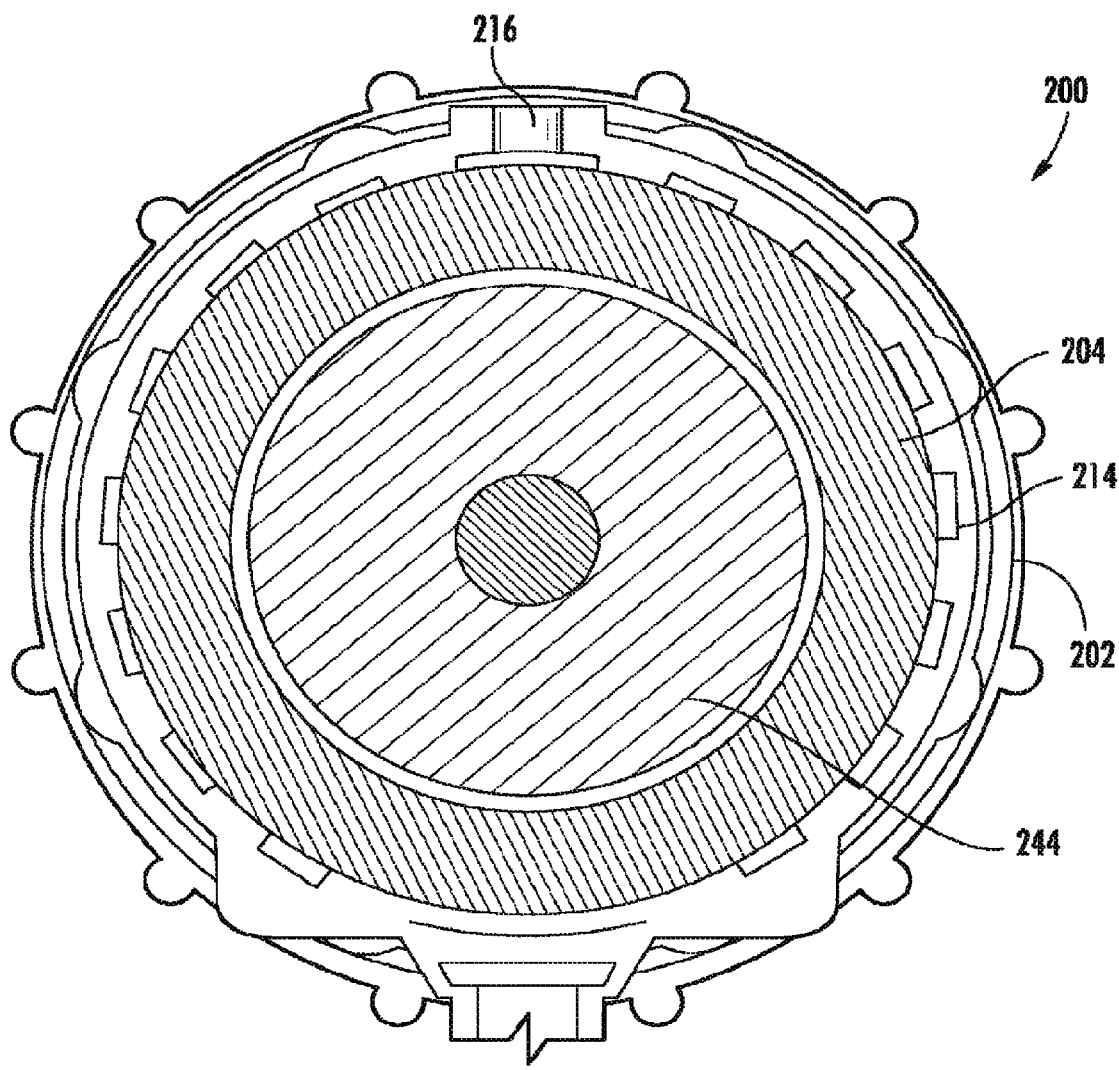
FIG. 11 is a cutaway end view of the example electric motor assembly of FIG. 9.

Another example embodiment of an electric motor assembly 200 is illustrated in FIGS. 9-11. The assembly 200 includes a housing 202, a first end shield 222 and a second end shield 224. The assembly 200 also includes a stator 204 with a stator core 206 including an outer surface 210 and windings having end turns 208 around the stator core 206. The assembly 200 also includes a rotor 244 positioned within the stator 204.

The housing 202 includes an inner surface 212. The inner surface 212 encloses the stator 204. The inner surface 212 of the housing 202 engages (e.g., contacts, couples with, is connected to, etc.) the outer surface 210 of the stator core 206. A fluid passage 214 is cooperatively defined by the outer surface 210 of the stator core 206 and a recessed channel 215 in the inner surface 212 of the housing 202. The fluid passage 214 permits a coolant (not illustrated) in the fluid passage 214 to contact portions of the outer surface 210 of the stator core 206 to remove heat from the stator core 206 during operation of the electric motor assembly 200. The coolant may be any suitable fluid for transferring heat. The coolant may be, for example, oil, air, a mixture of oil and air, etc.

The illustrated recessed channel 215, and accordingly the fluid passage 214, is generally S-shaped and traverses circumferentially and axially around at least part of the housing 202 along a central portion of the stator core 206. Lines 246 indicate approximate outer boundaries of the stator core 206 in FIG. 10. The recessed channel 215 may traverse around the entire circumference of the housing 202, or may traverse less than the entire circumference of the housing 202. Additionally, the recessed channel 215 may be oriented along the length of the housing 202 (e.g., substantially perpendicular to the illustrated recessed channel 215). The recessed channel 215 may be located offset from a central portion of the stator core 206. Alternatively, or additionally, the recessed channel 215 may traverse the housing both circumferentially and lengthwise, with no particular direction (e.g., random, meandering, etc.), etc. Additionally, the recessed channel 215 may have any suitable shape and is not limited to the serpentine shape shown in FIG. 10. The recessed channel 215 may be symmetrical, asymmetrical, a combination of symmetrical and asymmetrical, etc. Additionally, or alternatively, the assembly 200 may include more than one recessed channel 215. For example, there may be a recessed channel 215 on each half of the housing 202 (e.g., around opposite sides of the stator core 206).

The stator 204 is a laminated stator. The stator core 206 is constructed of a plurality of stator laminations (not separately illustrated) laminated together. The stator laminations have outer edges (which cooperatively form at least part of the outer surface 210 of the stator core 206). The fluid passage 214 is configured to permit coolant in the fluid passage 214 to contact the outer edges of the stator laminations.

As seen in FIG. 10, the housing 202 includes several fluid grooves 248 extending from the recessed channel 215. The fluid grooves 248 are in fluid communication with the recessed channel 215. Coolant flowing through the fluid passage 214 can flow into and through the fluid grooves 248. Portions of the fluid grooves 248 (e.g., the part of the fluid grooves 248 located between the lines 246) are located adjacent the outer surface 210 of the stator core 206. Accordingly, these parts of the fluid grooves 248 and the outer surface 210 of the stator core 206 cooperatively define an enclosed fluid groove to retain coolant in the fluid grooves 248 and through which the coolant may flow. Portions 250 of the fluid grooves 248 (sometime referred to herein as orifices) extend beyond the ends of the stator core 206 (marked by the lines 246). Coolant in the fluid grooves 248 is not retained in the fluid grooves 248 by the stator core 206 in these portions 250 (sometime referred to herein as orifices 250). Accordingly, the coolant is free to exit the fluid grooves 248 by the orifices 250. The fluid grooves 248 (including the orifices 250) are configured (e.g., shaped, sized, positioned, oriented, etc.) to spray coolant from the grooves 248 onto the end turns 208 of the stator 204 during operation of the assembly 200.

The assembly 200 includes a fluid inlet 216 in fluid communication with the fluid passage 214. The assembly 200 also includes a fluid outlet 218 in fluid communication with the fluid passage 214. A fluid collection area 220 is located adjacent the fluid outlet 218. The fluid outlet 218 and the fluid collection area 220 are located below the stator 204.

During operation of the electric motor assembly 200, coolant enters the assembly 200 through the fluid inlet 216 and flows through the fluid passage 214 toward the fluid outlet 218. While flowing in the fluid passage 214, the coolant is in direct contact with the outer surface 210 of the stator core 206. More particularly, the coolant is in direct contact with the stator laminations. Heat is transferred by this contact from the stator core 206 to the coolant. Generally, the coolant exits the fluid passage 214 through the fluid outlet 218 and the fluid collection area 220. Some of the coolant is directed through the fluid grooves 248 to be sprayed from the orifices 250 to cool the end turns 208, as discussed above. The coolant that exits the fluid outlet 218 is returned to the fluid inlet 216. During the recirculation to the fluid inlet 216, the coolant may be processed with at least one heat exchanger to release at least some of the heat the coolant received from the stator core 206. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

The coolant is forcefully circulated through the assembly 200 (and more particularly, through the fluid passage 214 and the grooves 248) using pressure. The pressure and speed of the coolant may be varied to achieve desired cooling, desired spray from the orifices 250, etc. Alternatively, or additionally, the coolant may be circulated by any other suitable means (including, e.g., by gravity).

Figure 12:
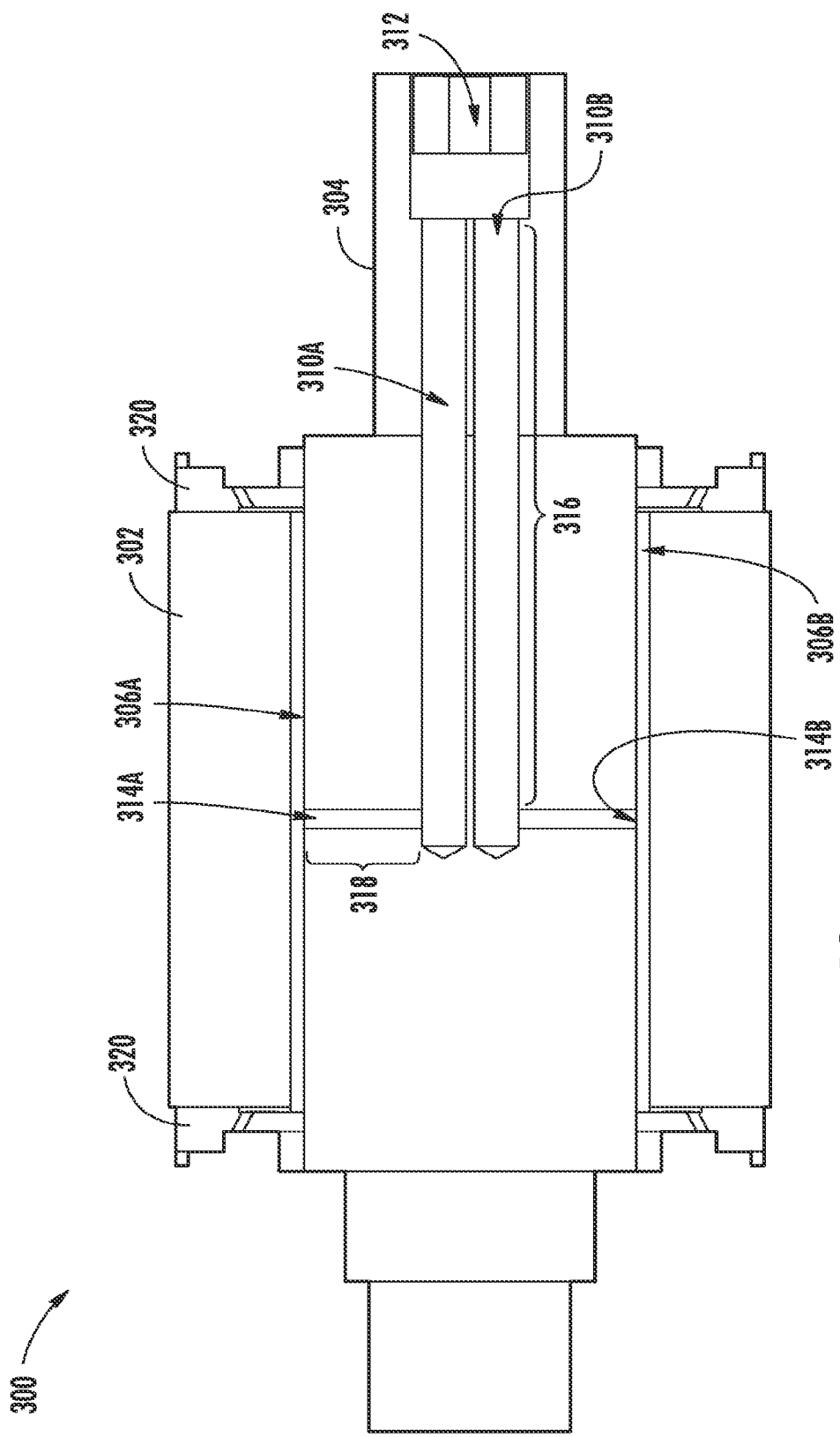
FIG. 12 is a cutaway side view of an example rotor assembly including a rotor and a shaft according to at least one aspect of this disclosure.
Figure 13:
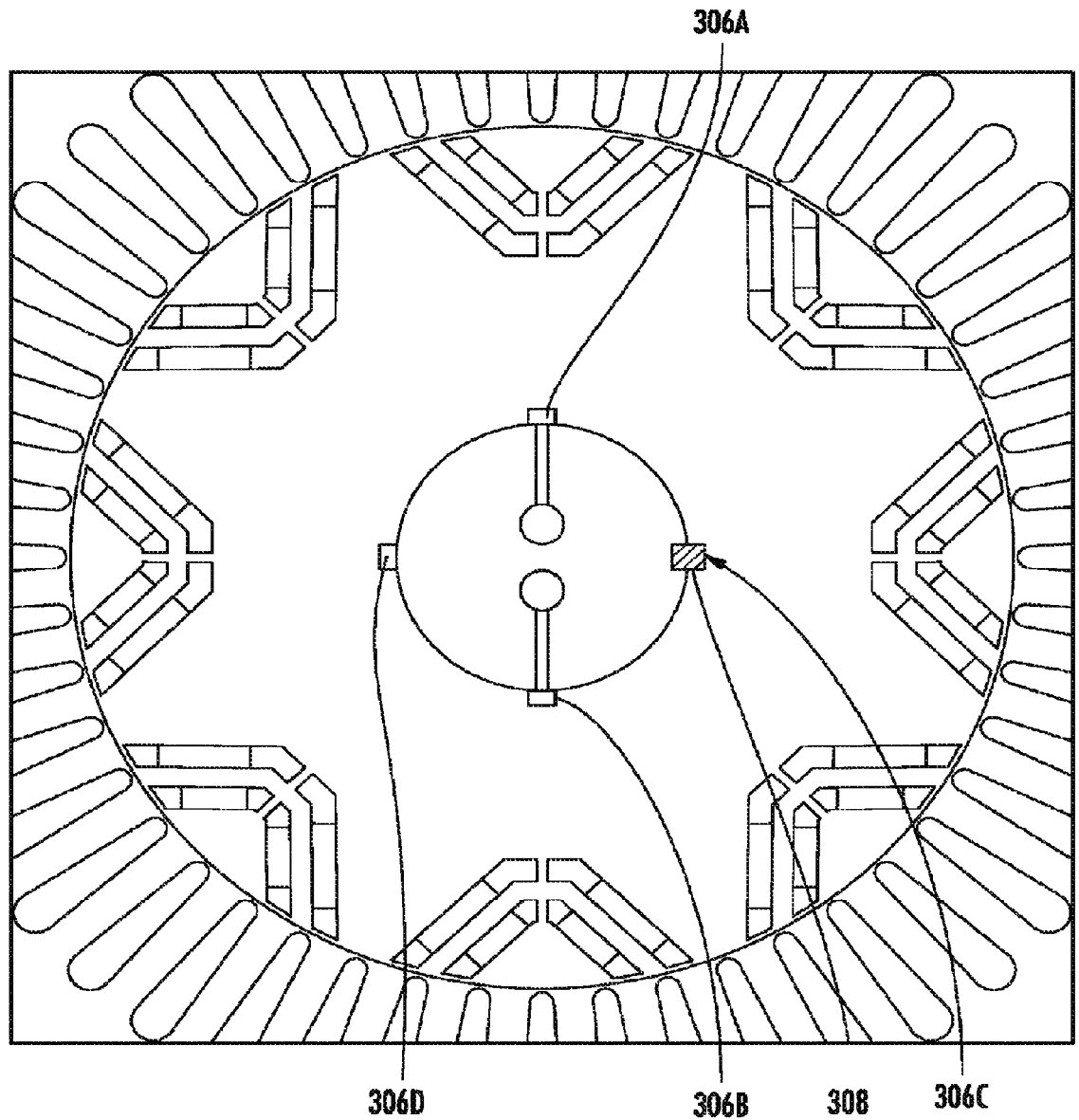
FIG. 13 is a cutaway end view of the rotor assembly of FIG. 12.
Figure 14:
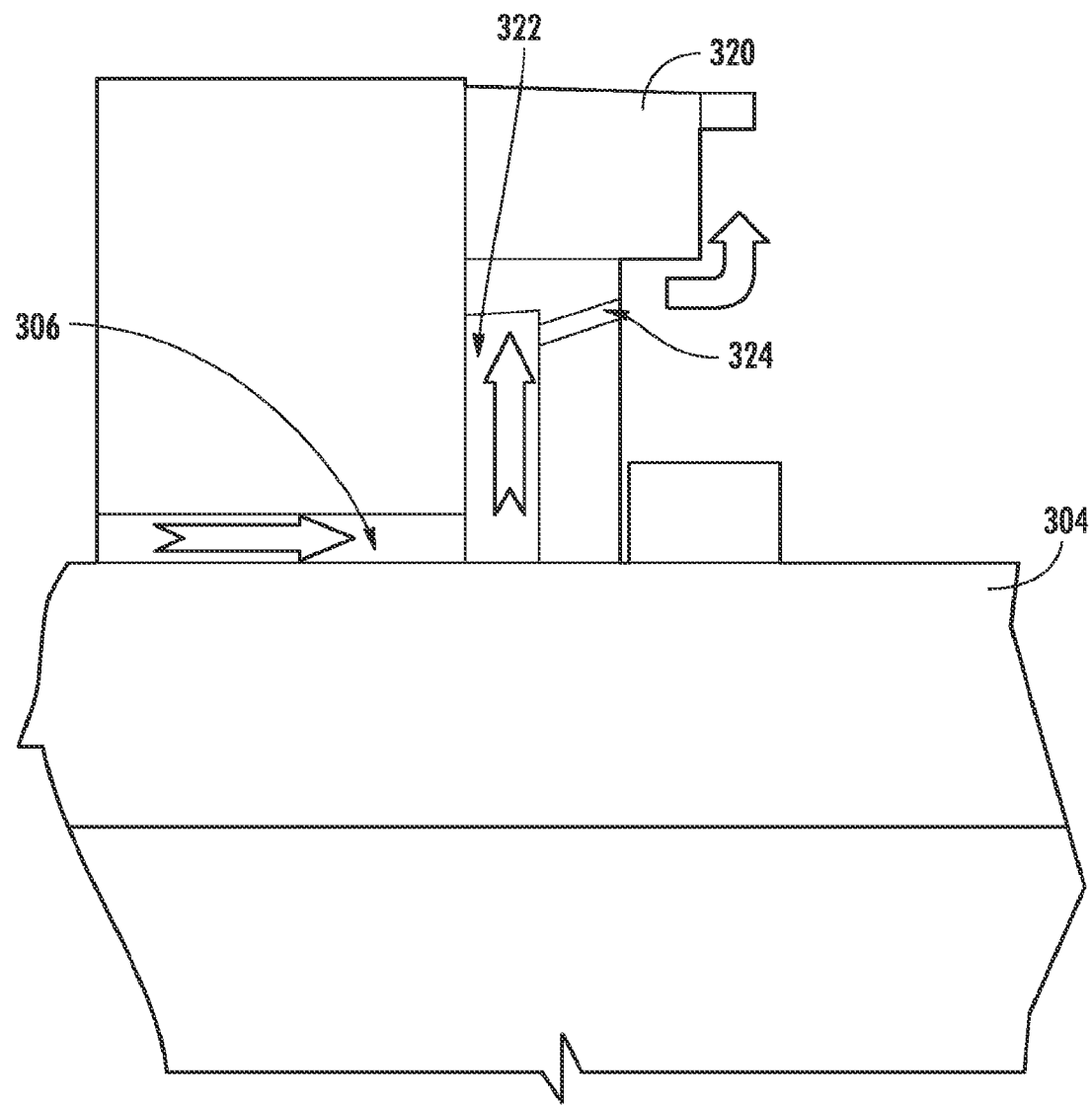
FIG. 14 is a close-up view of a portion of the end plate, rotor and shaft of FIG. 12.

An example embodiment of a rotor assembly 300 for use in an electric motor assembly is illustrated in FIGS. 12-14. The rotor assembly 300 may be used in electric motor assembly 100 or electric motor assembly 200, or in any other suitable motor assembly, with or without the stator cooling features disclosed herein.

The rotor assembly 300 includes a rotor 302 and a shaft 304 coupled to the rotor 302.

The rotor 302 includes four keyways 306A, 306B, 306C and 306D (sometimes collectively and/or generically referred to herein as keyways 306) extending longitudinally through the rotor 302. One or more of the keyways 306 are typically used to couple the rotor 302 to the shaft 304. As shown in FIG. 13, keyway 306C includes a key 308 within keyway 306C to couple the rotor 302 to the shaft 304. The remaining keyways 306A, 306B, 306D are not used for coupling the rotor 302 to the shaft 304 using a key 308. The key 308 may be a separate component or may be part of the shaft 304. More than one keyway may be used, in conjunction with a key 308, to couple the shaft 304 to the rotor 302 and the rotor 302 may include more or fewer keyways 306.

The shaft 304 includes two internal fluid paths 310A and 310B (sometimes collectively and/or generically referred to herein as internal fluid path 310) extending longitudinally through part of the shaft 304. The internal fluid paths 310A and 310B may be considered to make up a single internal fluid path 310 and/or may each be considered a separate internal fluid path 310. Alternatively, the shaft 304 may include a single internal fluid path 310, or more than two internal fluid paths 310. The internal fluid paths 310A, 310B are coupled in fluid communication with an input port 312 located at one end of the shaft 304. Internal fluid path 310A includes an exit port 314A and internal fluid path 310B includes a fluid exit port 314B (sometimes collectively and/or generically referred to herein as fluid exit port 314). The internal fluid paths 310 each include a first portion 316 extending substantially longitudinally through the rotor 302 and a second portion 318 extending substantially radially through the rotor 302 between the first portion 316 and the fluid exit port 314. The internal fluid paths 310 are illustrated with a generally circular cross-section, but may have any suitable cross-section, including, for example, an elliptical cross¡ section.

The keyways 306A and 306B are coupled in fluid communication to internal fluid paths 310 via the exit ports 314. Accordingly, coolant may flow through internal fluid path 310A and into (and through) keyway 306A. The coolant contacts portions of the rotor 302 in the keyway 306A to remove heat from the rotor 302 during operation of an electric machine incorporating the rotor assembly 300. Similarly, coolant may flow through internal fluid path 310B and into (and through) keyway 306B. The coolant contacts portions of the rotor 302 in the keyway 306B to remove heat from the rotor 302 during operation of an electric machine incorporating the rotor assembly 300.

The rotor assembly 300 includes two end plates 320 coupled to opposing ends of the rotor 302. Each end plate 320 cooperatively defines with the rotor 302 a fluid passage 322 between the end of the rotor 302 and the end plate 320. The fluid passage 322 is connected in fluid communication with the keyways 306 to permit coolant in the keyways 306 to contact the end of the rotor 302 during operation of an electric machine incorporating the rotor assembly 300.

Each end plate 320 includes orifices 324 extending through the end plate 320. The orifices 324 are in fluid communication with the fluid passage 322 to permit coolant flowing through the rotor assembly 300 to exit the rotor assembly 300. Although illustrated with two such end plates 320 with orifices 324, the rotor 302 may include a single end plate 320, may include one end plate 320 with orifices 324 and another end plate 320 without orifices 324, may include endplate(s) 320 with more or fewer orifices 324, etc.

With reference to one side of the rotor assembly 300, in operation, coolant is pumped into the internal fluid path 310A in the shaft 304. The coolant travels longitudinally down the shaft 304 and then radially toward the exit port 314A. Coolant then enters the keyway 306A and travels through the keyway 306A toward both ends of the rotor 302. During this passage through the keyway 306A, the coolant is in contact with the rotor 302 and removes some heat from the rotor 302. The coolant enters the fluid passage 322 and contacts the ends of the rotor 302, removing additional heat from the rotor 302. The coolant is then expelled from the rotor assembly 300 through the orifices 324 in the end plates 320. The expelled coolant is collected (such as via drainage ports 143 if the rotor assembly 300 were used in electric motor assembly 100) and recirculated to the input port 312. During the recirculation, the coolant may be processed to release at least some of the heat the coolant received from the rotor 302. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

Figure 15:
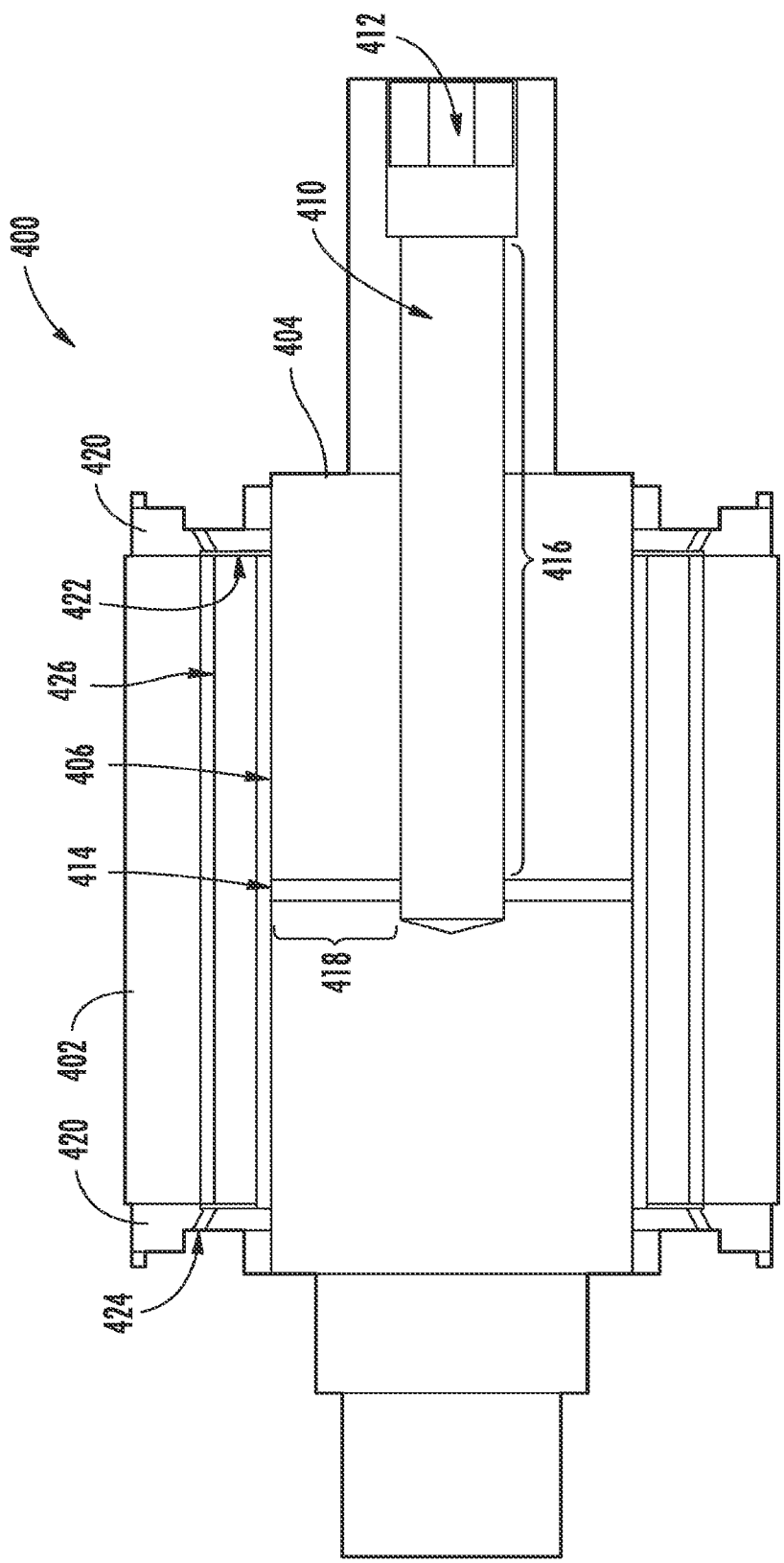
FIG. 15 is a cutaway side view of another example rotor assembly including a rotor and a shaft according to at least one aspect of this disclosure.
Figure 16:
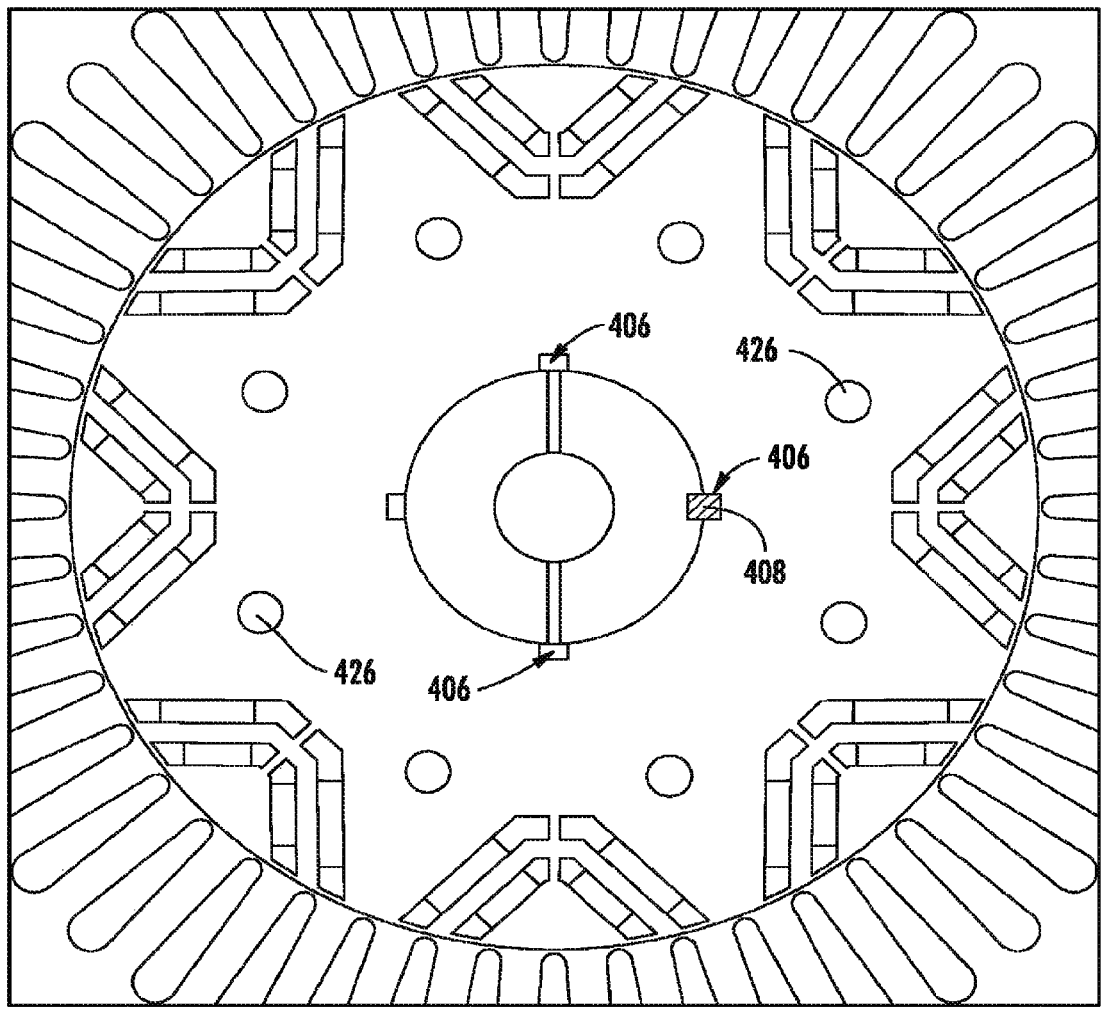
FIG. 16 is a cutaway end view of the rotor assembly of FIG. 15.
Figure 17:
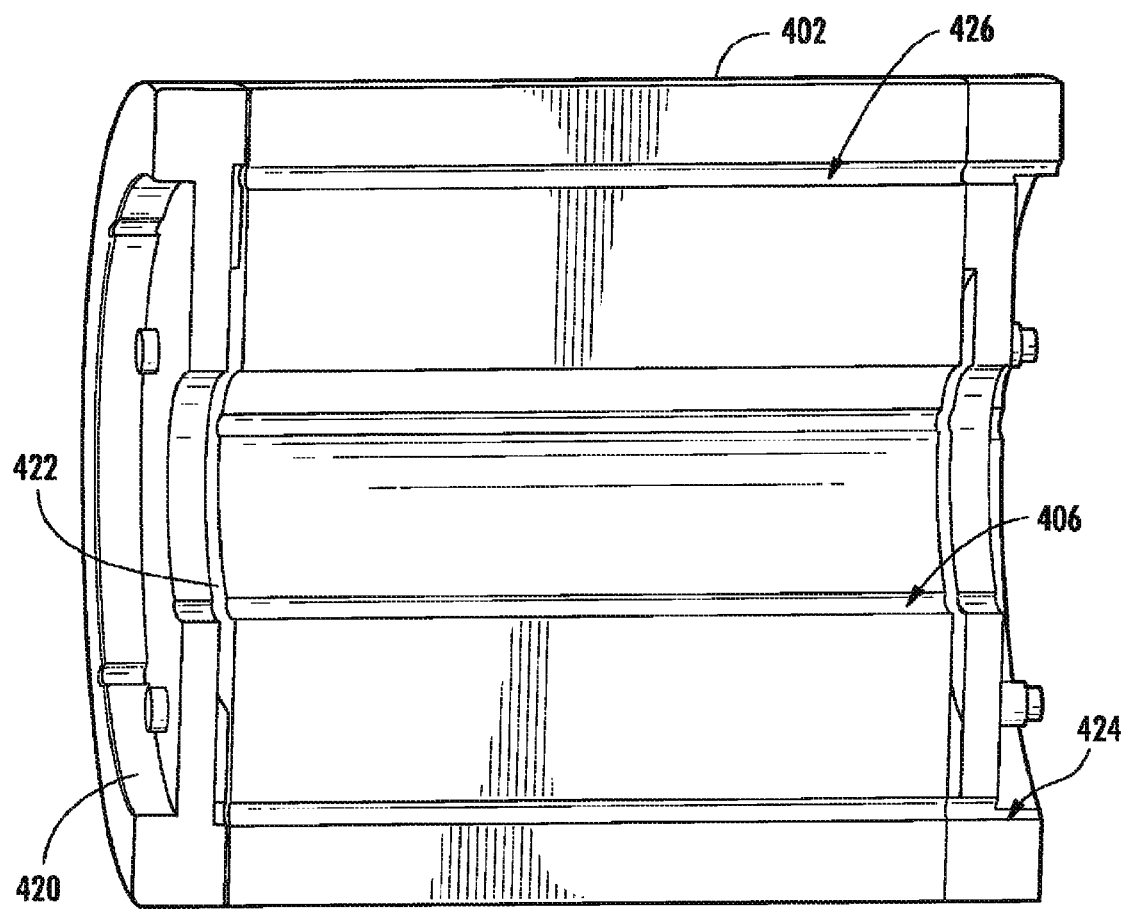
FIG. 17 is a side isometric view of half of the rotor and end plate of the rotor assembly of FIG. 15.

Another example embodiment of a rotor assembly 400 for use in an electric motor assembly is illustrated in FIGS. 15-17. The rotor assembly 400 may be used in electric motor assembly 100 or electric motor assembly 200, or in any other suitable motor assembly, with or without the stator cooling features disclosed herein.

The rotor assembly 400 includes a rotor 402 and a shaft 404 coupled to the rotor 402.

The rotor 402 includes four keyways 406 extending longitudinally through the rotor 402. One or more of the keyways 406 are typically used to couple the rotor 402 to the shaft 404. As shown in FIG. 16, one keyway 406 includes a key 408 within the keyway 406 to couple the rotor 402 to the shaft 404. The remaining keyways 406 are not used for coupling the rotor 402 to the shaft 404 using a key 408. The key 408 may be a separate component or may be part of the shaft 404. More than one keyway may be used, in conjunction with a key 408, to couple the shaft 404 to the rotor 402 and the rotor 402 may include more or fewer keyways 406.

The shaft 404 includes an internal fluid path 410 extending through part of the shaft 404. The internal fluid path 410 is coupled in fluid communication with an input port 412 located at one end of the shaft 404. Internal fluid path 410 includes exit ports 414. The internal fluid path 410 includes a first portion 416 extending substantially longitudinally through the rotor 402 and second portions 418 extending substantially radially through the rotor 402 between the first portion 416 and the fluid exit ports 414. The internal fluid path 410 is illustrated with a generally circular cross-section, but may have any suitable cross-section, including, for example, an elliptical cross-section.

The keyways 406 are coupled in fluid communication to internal fluid path 410 via the exit ports 414. Accordingly, coolant may flow through internal fluid path 410 and into (and through) the keyways 406. The coolant contacts portions of the rotor 402 in the keyways 406 to remove heat from the rotor 402 during operation of an electric machine incorporating the rotor assembly 400.

The rotor 402 includes fluid passageways 426. The fluid passageways 426 extend longitudinally through the rotor 402 from end to end. The fluid passageways 426 provide another path through which coolant may flow to contact different portions of the rotor 402 to remove heat from the rotor 402.

The rotor assembly 400 includes two end plates 420 coupled to opposing ends of the rotor 402. Each end plate 420 cooperatively defines with the rotor 402 a fluid passage 422 between the end of the rotor 402 and the end plate 420. The fluid passage 422 is connected in fluid communication with the keyways 406 to permit coolant in the keyways 406 to contact the end of the rotor 402 during operation of an electric machine incorporating the rotor assembly 400. The fluid passage 422 also connects the keyways 406 with the fluid passageways 426. Accordingly, coolant may flow from the keyways 406, through the fluid passage 422, and into (and through) the fluid passageways 426.

Each end plate 420 includes orifices 424 extending through the end plate 420. The orifices 424 are in fluid communication with the fluid passage 422 to permit coolant flowing through the rotor assembly 400 to exit the rotor assembly 400. Although illustrated with two such end plates 420 with orifices 424, the rotor 402 may include a single end plate 420, may include one end plate 420 with orifices 424 and another end plate 420 without orifices 424, may include endplate(s) 420 with more or fewer orifices 424, etc.

In operation, coolant is pumped into the internal fluid path 410 in the shaft 404. The coolant travels longitudinally down the shaft 404 and then radially toward the exit ports 414. Coolant then enters the keyways 406 and travels through the keyways 406 toward both ends of the rotor 402. During this passage through the keyways 406, the coolant is in contact with the rotor 402 and removes some heat from the rotor 402. The coolant enters the fluid passage 422 and contacts the ends of the rotor 402, removing additional heat from the rotor 402. Some of the coolant is then expelled from the rotor assembly 400 through the orifices 424 in the end plates 420, while some of the coolant enters the fluid passageways 426. The coolant travels through the fluid passageways 426, removing additional heat from the rotor 402. Coolant exits the fluid passageways 426 into the fluid passage 422 adjacent one of the orifices 424 and may be expelled from the rotor through the orifice 424. The expelled coolant is collected (such as via drainage ports 143 if the rotor assembly 400 is used in electric motor assembly 100 shown in FIGS. 1-8) and recirculated to the input port 412. During the recirculation, the coolant may be processed to release at least some of the heat the coolant received from the rotor 402. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

Figure 18:
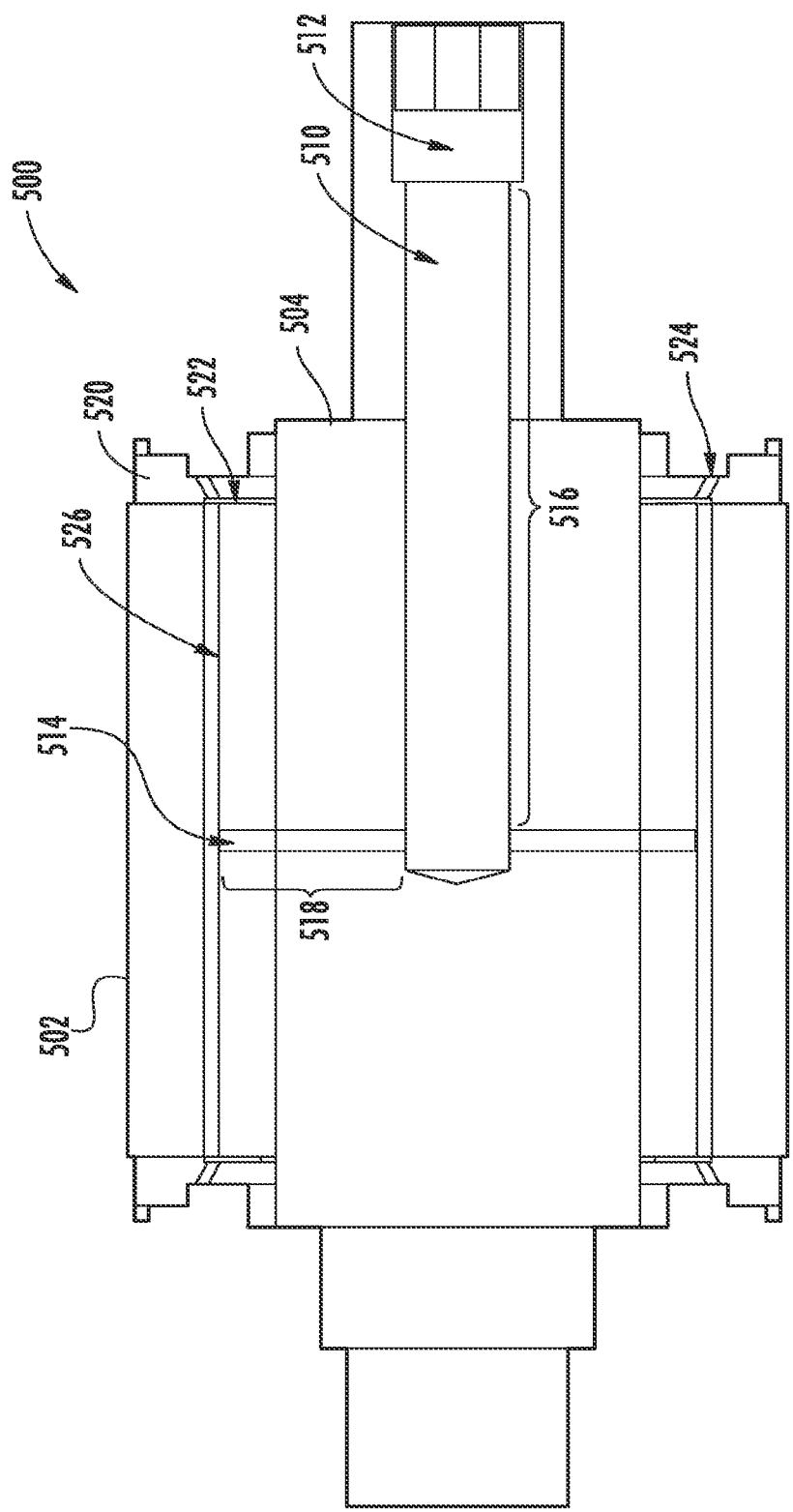
FIG. 18 is a cutaway side view of yet another example rotor assembly including a rotor and a shaft according to at least one aspect of this disclosure.
Figure 19:
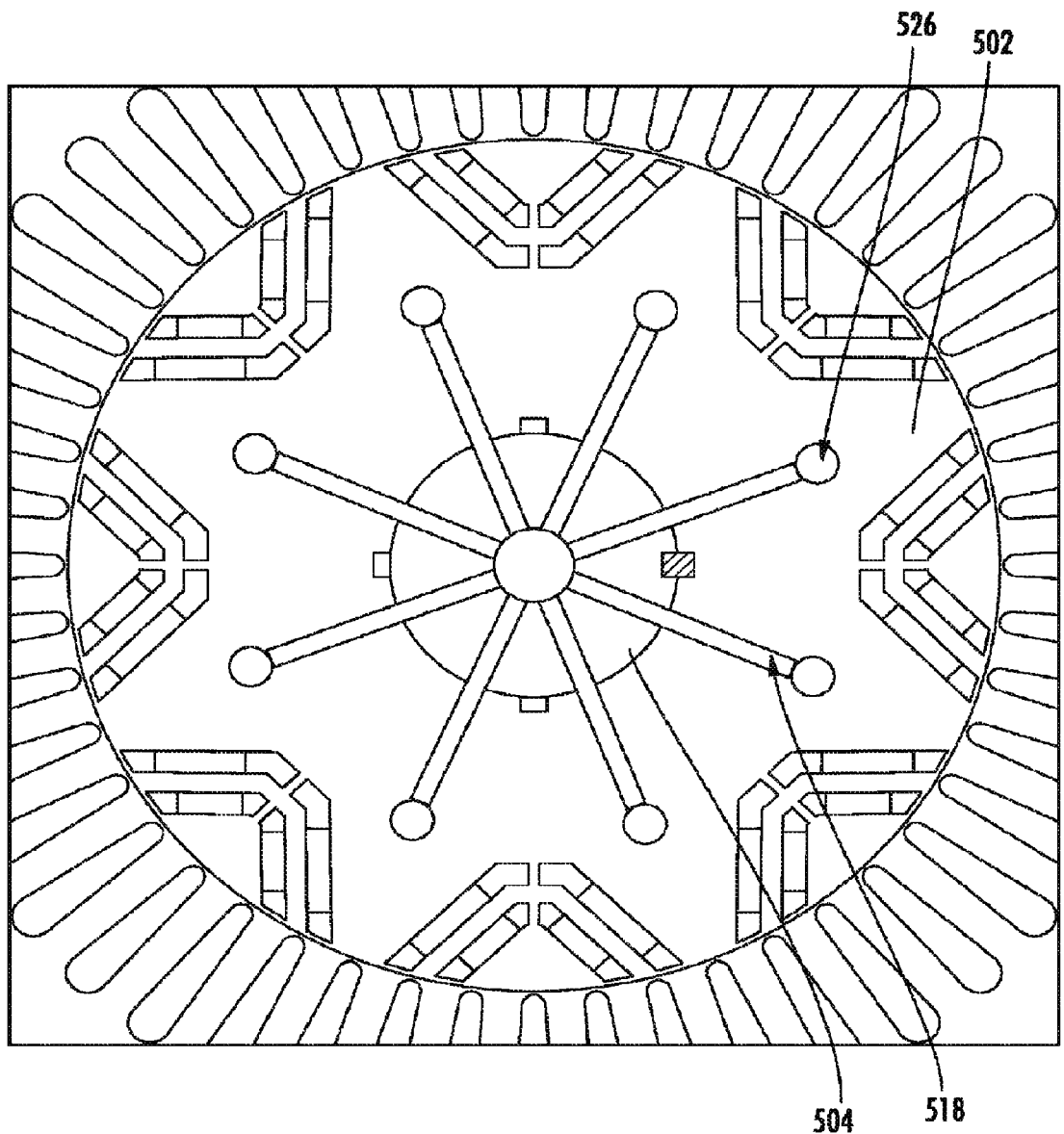
FIG. 19 is a cutaway end view of the rotor assembly of FIG. 18.
Figure 20:
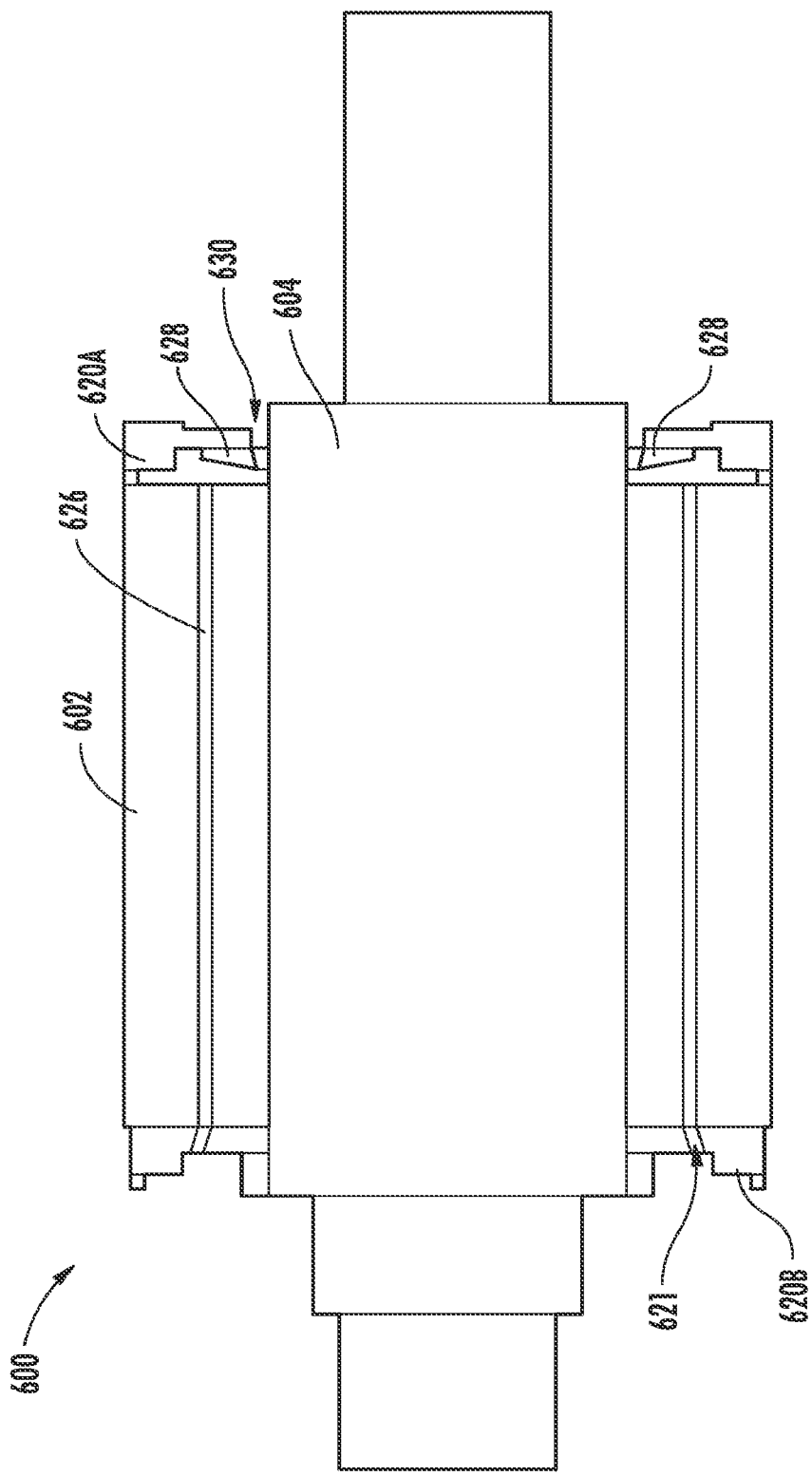
FIG. 20 is a cutaway side view of another example a rotor assembly including a rotor and a shaft according to at least one aspect of this disclosure.
Figure 21:
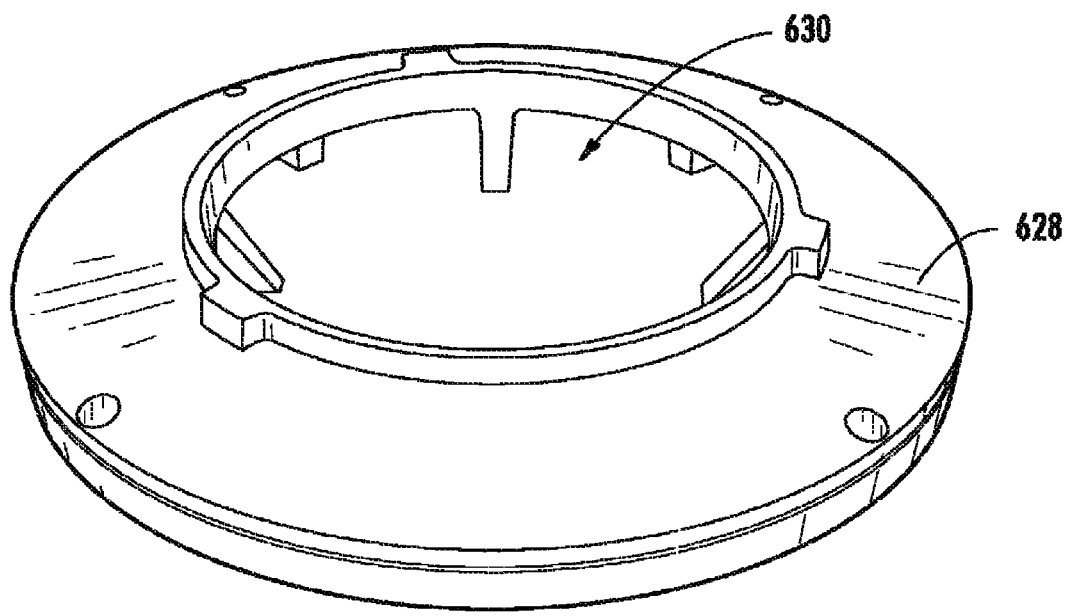
FIG. 21 is a top isometric view of one of the end plate of the assembly in FIG. 20.
Figure 22:
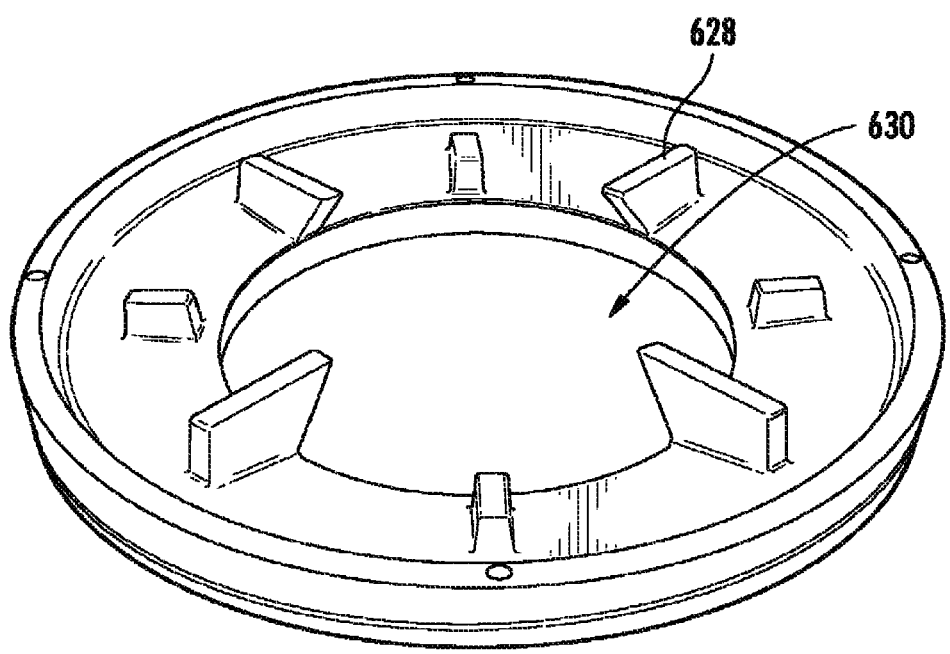
FIG. 22 is a bottom isometric view of one of the end plate of the assembly in FIG. 20.
Figure 23:
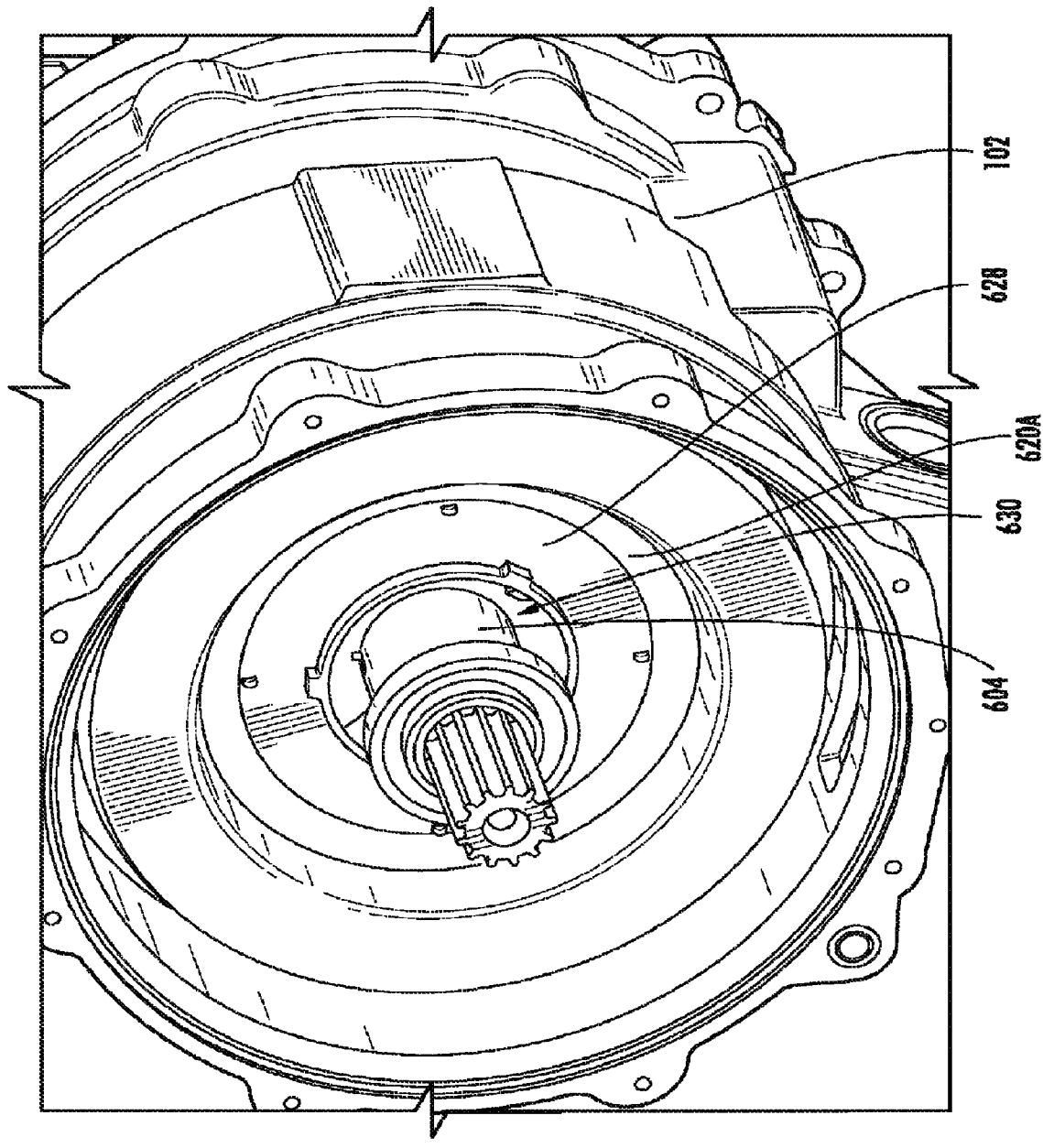
FIG. 23 is an isometric view of the rotor assembly of FIG. 20 installed in an electric motor assembly.
Figure 24:
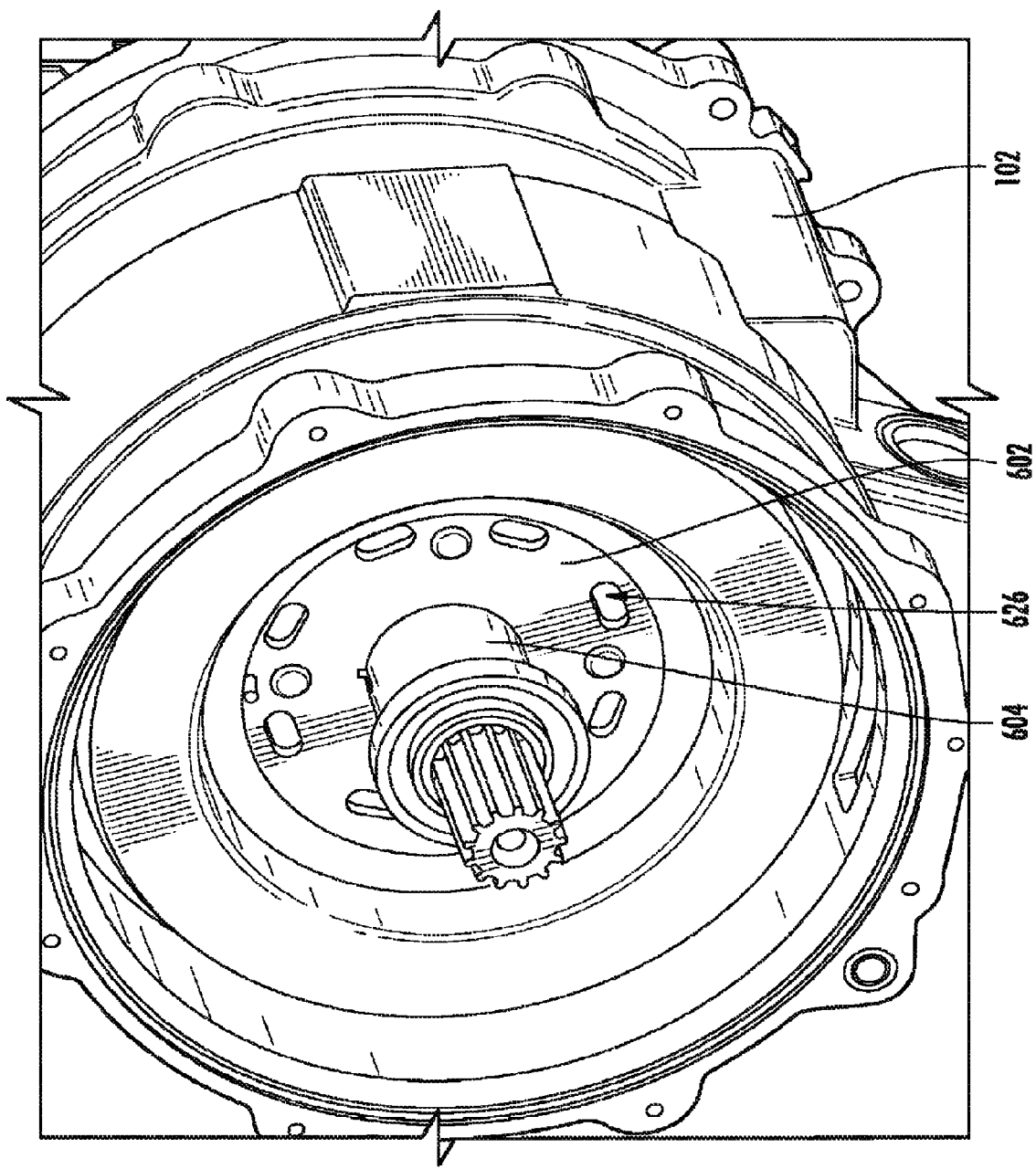
FIG. 24 is an isometric view of the rotor assembly of FIG. 20 installed in an electric motor assembly with one of the rotor assembly's end plates removed.
Figure 25:
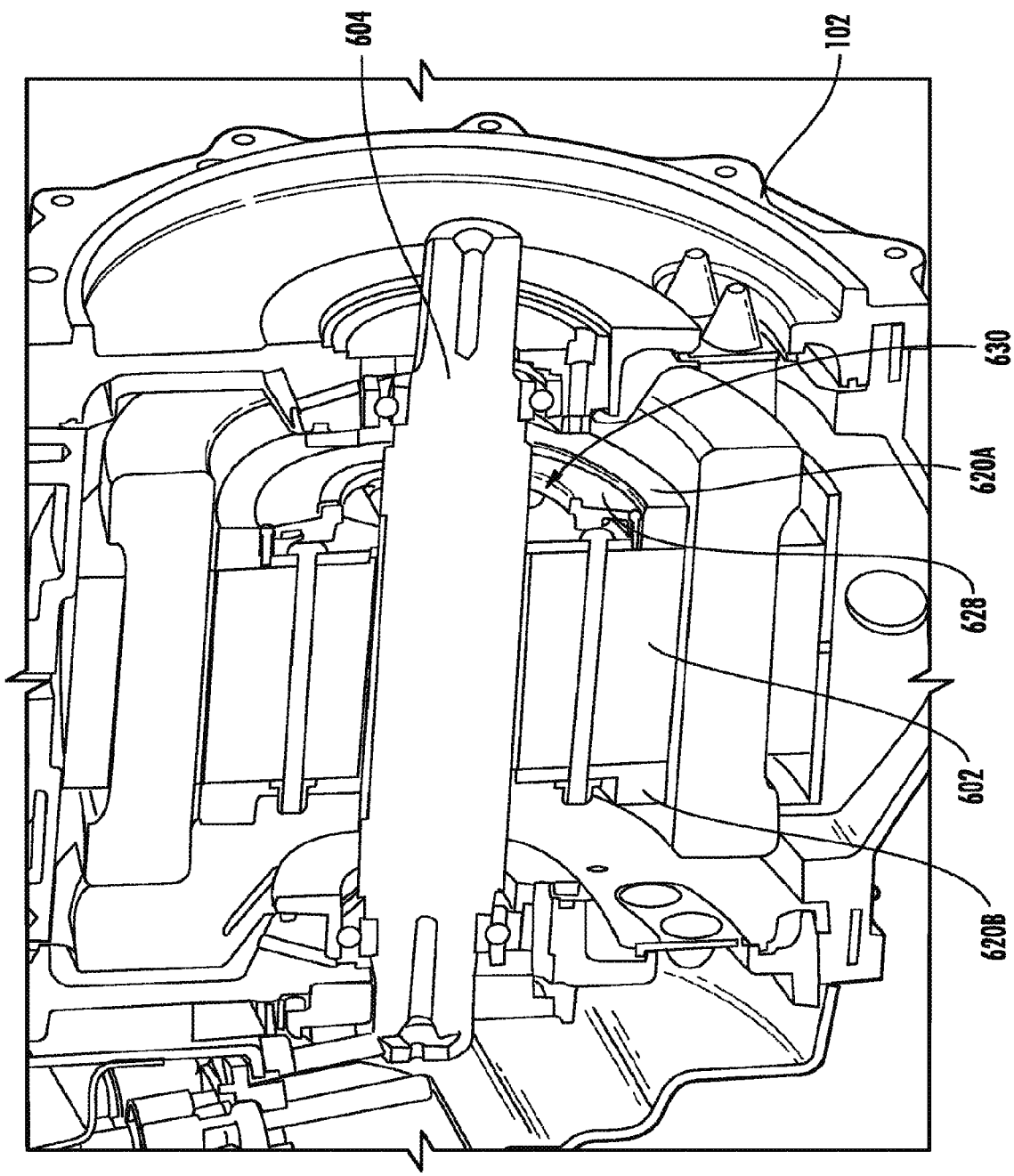
FIG. 25 is a front side isometric view of the rotor assembly of FIG. 20 installed in an electric motor assembly.
Figure 26:
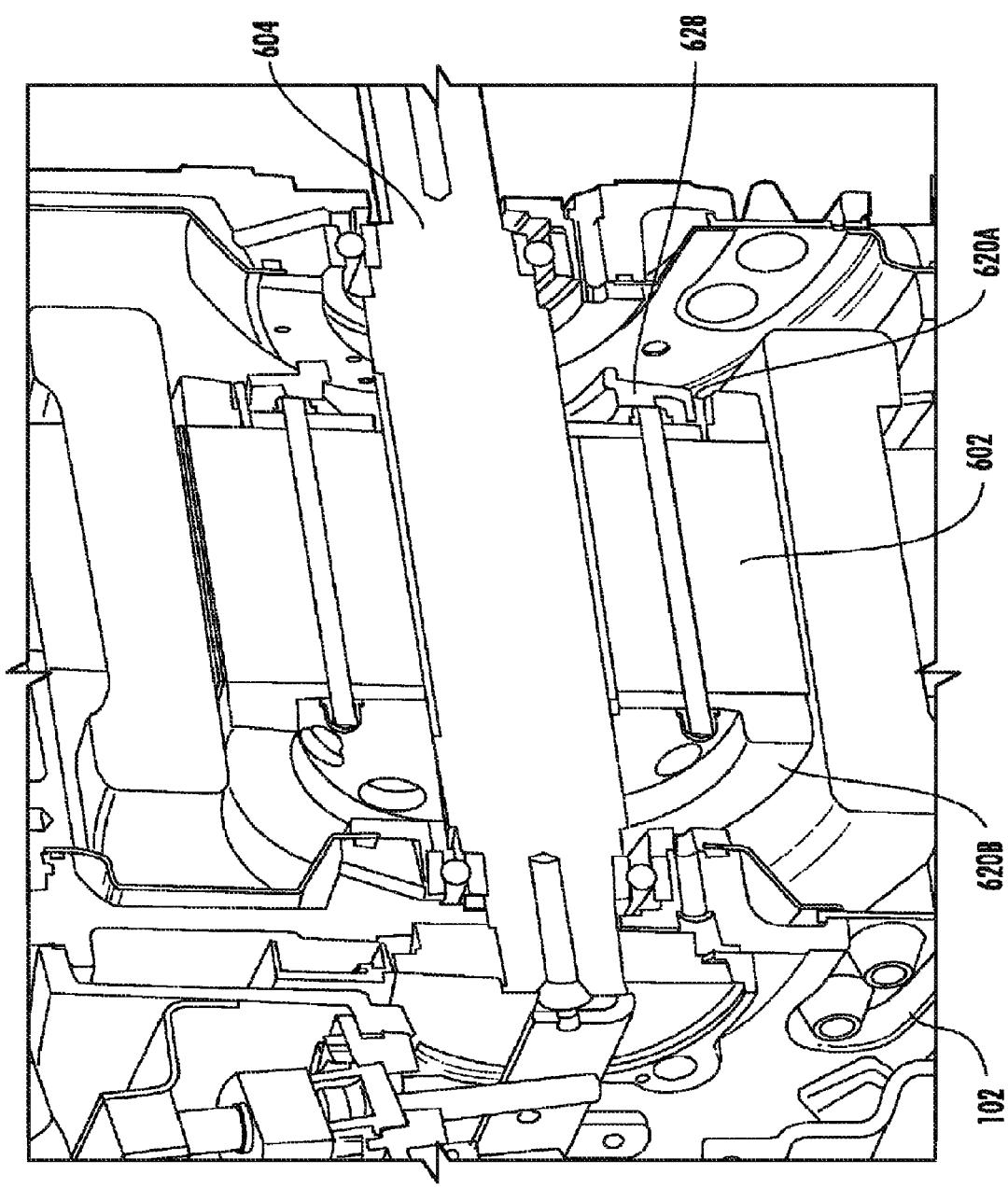
FIG. 26 is a rear side isometric view of the rotor assembly of FIG. 20 installed in an electric motor assembly.
Figure 27:
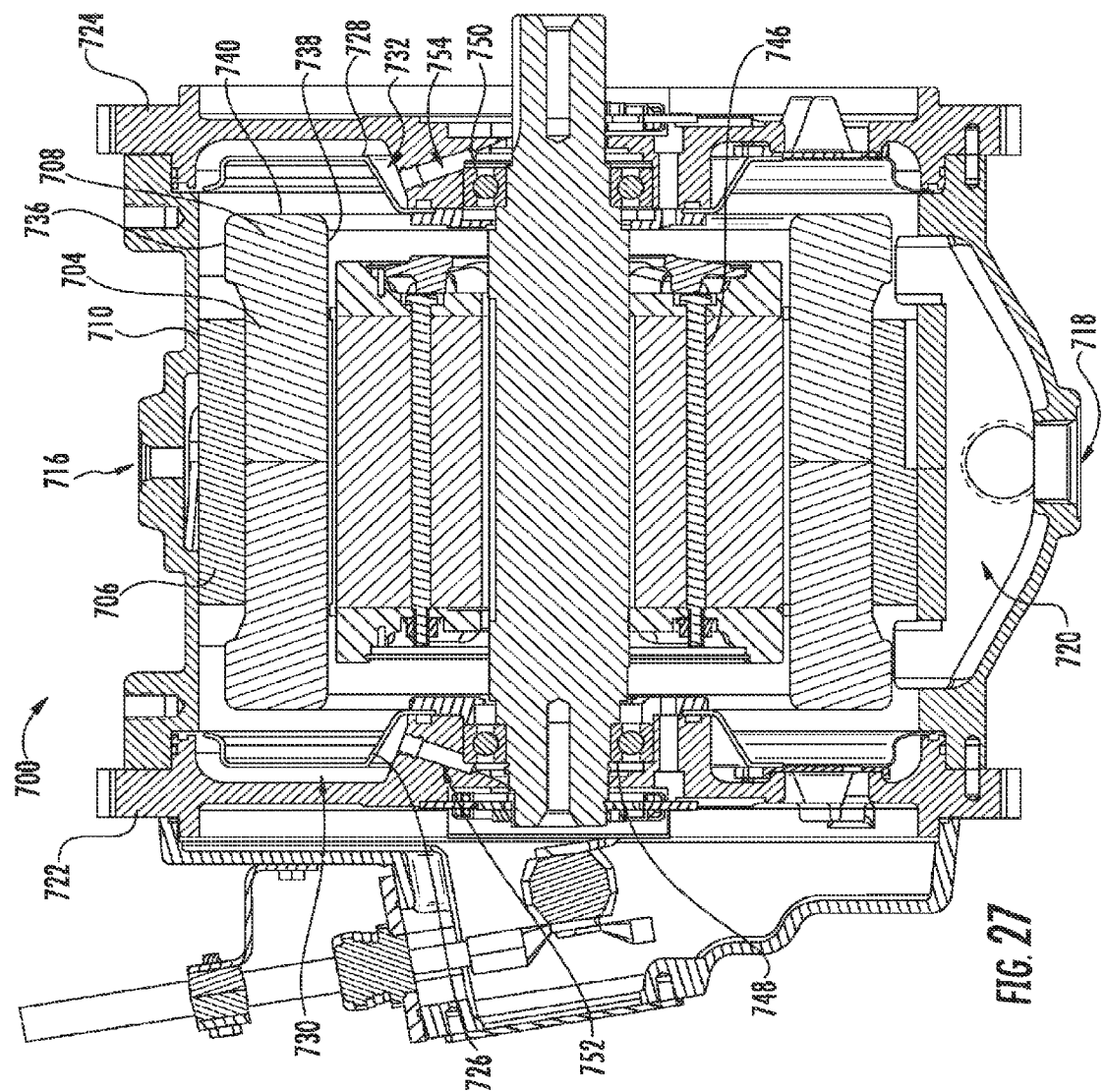
FIG. 27 is a cutaway side view of another example electric motor assembly according to aspects of the present disclosure.

In FIGS. 18 and 19, yet another example embodiment of a rotor assembly 500 for use in an electric motor assembly is illustrated. The rotor assembly 500 may be used in electric motor assembly 100 or electric motor assembly 200, or in any other suitable motor assembly, with or without the stator cooling features disclosed herein.

The rotor assembly 500 includes a rotor 502 and a shaft 504 coupled to the rotor 502.

The shaft 504 includes an internal fluid path 510 extending through part of the shaft 504. The internal fluid path 510 is coupled in fluid communication with an input port 512 located at one end of the shaft 504. Internal fluid path 510 includes exit ports 514. The internal fluid path 510 includes a first portion 516 extending substantially longitudinally through the rotor 502 and second portions 518 extending substantially radially through the rotor 502 between the first portion 516 and the fluid exit ports 514. The internal fluid path 510 is illustrated with a generally circular cross-section, but may have any suitable cross-section, including, for example, an elliptical cross-section.

The rotor 502 includes fluid passageways 526. The fluid passageways 526 extend longitudinally through the rotor 502 from end to end. The fluid passageways 526 are coupled in fluid communication to internal fluid path 510 via the exit ports 514. Accordingly, coolant may flow through internal fluid path 510 and into (and through) the fluid passageways 526. The coolant contacts portions of the rotor 502 in the fluid passageways 526 to remove heat from the rotor 502 during operation of an electric machine incorporating the rotor assembly 500.

The rotor assembly 500 includes two end plates 520 coupled to opposing ends of the rotor 502. Each end plate 520 cooperatively defines with the rotor 502 a fluid passage 522 between the end of the rotor 502 and the end plate 520. The fluid passage 522 is connected in fluid communication with the fluid passageways 526 to permit coolant in the fluid passageways 526 to contact the end of the rotor 502 during operation of an electric machine incorporating the rotor assembly 500.

Each end plate 520 includes orifices 524 extending through the end plate 520. The orifices 524 are in fluid communication with the fluid passage 522 to permit coolant flowing through the rotor assembly 500 to exit the rotor assembly 500. Although illustrated with two such end plates 520 with orifices 524, the rotor 502 may include a single end plate 520, may include one end plate 520 with orifices 524 and another end plate 520 without orifices 524, may include endplate(s) 520 with more or fewer orifices 524, etc.

In operation, coolant is pumped into the internal fluid path 510 in the shaft 504. The coolant travels longitudinally down the shaft 504 and then radially toward the exit ports 514. Coolant then enters the fluid passageways 526 and travels through the fluid passageways 526 toward both ends of the rotor 502. During this passage through the fluid passageways 526, the coolant is in contact with the rotor 502 and removes some heat from the rotor 502. The coolant enters the fluid passage 522 and contacts the ends of the rotor 502, removing additional heat from the rotor 502. The coolant is then expelled from the rotor assembly 500 through the orifices 524 in the end plates 520. The expelled coolant is collected (such as via drainage ports 143 if the rotor assembly 500 is used in electric motor assembly 100) and recirculated to the input port 512. During the recirculation, the coolant may be processed to release at least some of the heat the coolant received from the rotor 502. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

In FIGS. 20-26 yet another example embodiment of a rotor assembly 600 for use in an electric motor assembly is illustrated. In FIGS. 23-26, the rotor assembly 600 is illustrated assembled in electric motor assembly 100. The rotor assembly 600 may, however, be used in electric motor assembly 200 or in any other suitable motor assembly, with or without the stator cooling features disclosed herein.

The rotor assembly 600 includes a rotor 602 and a shaft 604 coupled to the rotor 602.

The rotor 602 includes fluid passageways 626. The fluid passageways 626 extend longitudinally (i.e., in the axial direction) through the rotor 602 from end to end. The coolant contacts portions of the rotor 602 in the fluid passageways 626 to remove heat from the rotor 602 during operation of an electric machine incorporating the rotor assembly 600.

The rotor assembly 600 includes two end plates 620A and 620B (collectively and/or generally endplates 620) coupled to opposing ends of the rotor 602. End plate 620B includes orifices 621 aligned with the fluid passageways 626 and extending through the end plate 620B. The orifices 621 permit coolant flowing through the rotor assembly 600 to exit the rotor assembly 600. An impeller 628 (e.g., a fan, etc.) with a fluid port 630 is coupled to the end plate 620A. The fluid port 630 is in fluid communication with the fluid passageways 626. When the shaft 604 and the endplate 620A are rotated, the impeller 628 rotates and draws coolant into the fluid port 630, and through the fluid passageways 626 through the rotor 602, to remove heat from the rotor 602.

The coolant may be any suitable coolant, including, for example, oil, air, oil and air, etc.

In operation, the shaft 604, rotor 602 and end plates 620 are rotated. Because of the rotation of the end plate 620A, the impeller 628 draws coolant in through the fluid port 630 and into the fluid passageways 626. The coolant travels through the fluid passageways 626 toward the end plate 620B. During this passage through the fluid passageways 626, the coolant is in contact with the rotor 602 and removes some heat from the rotor 602. The coolant is then expelled from the rotor assembly 600 through the orifices 621 in the end plate 620B. The expelled coolant is collected (such as via drainage ports 143 if the rotor assembly 600 is used in electric motor assembly 100) and recirculated. During the recirculation, the coolant may be processed to release at least some of the heat the coolant received from the rotor 602. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

Another example electric motor assembly 700, according to one or more aspects of the present disclosure will be described with reference to FIGS. 27-30.

The assembly 700 includes a housing 702 and a stator 704. The stator 704 includes a stator core 706 with windings having end turns 708 around the stator core 706. The stator core includes an outer surface 710.

Figure 28:
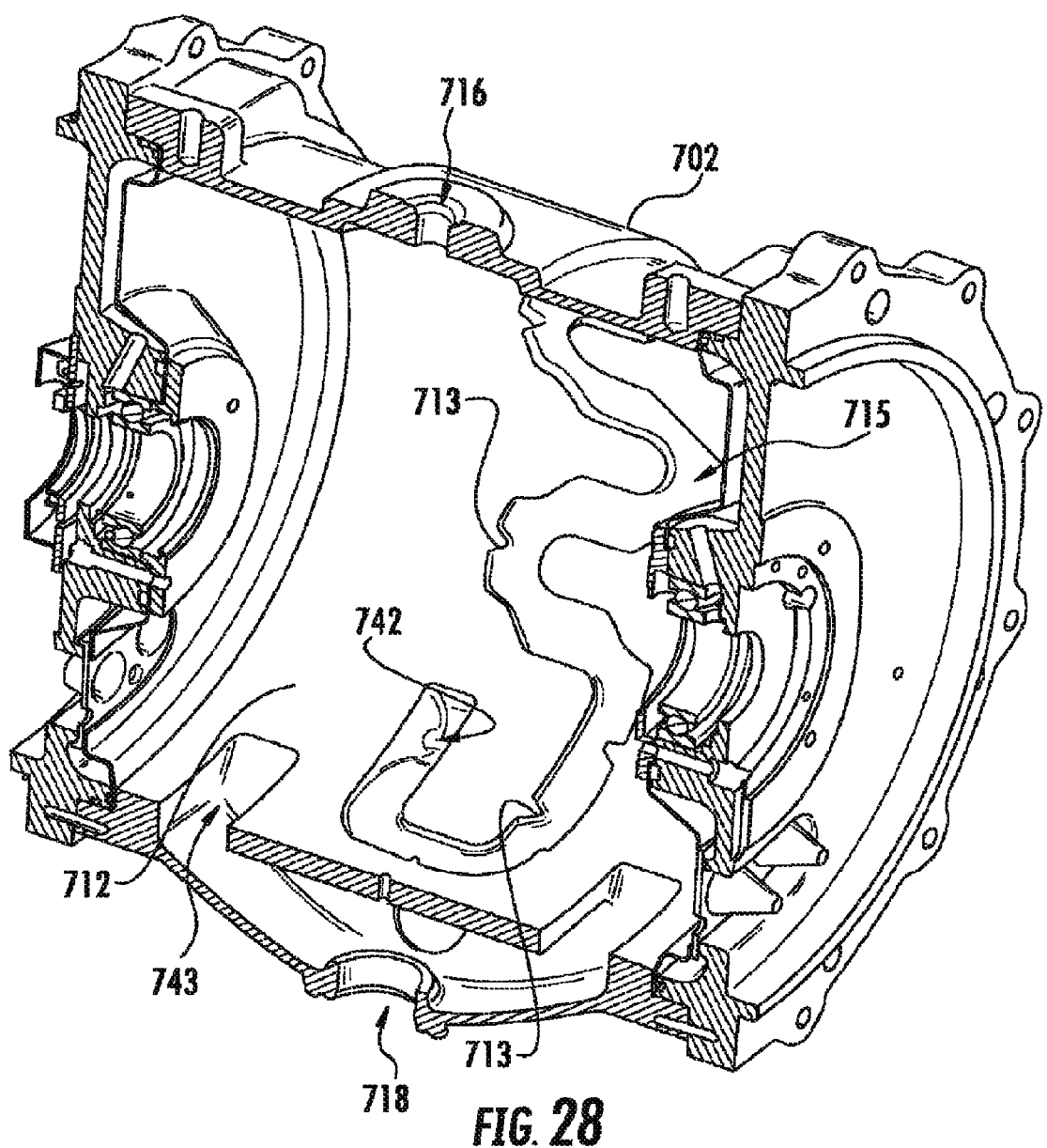
FIG. 28 is a top right isometric cutaway view of the example electric motor assembly of FIG. 27 with the rotor and shaft removed.
Figure 29:
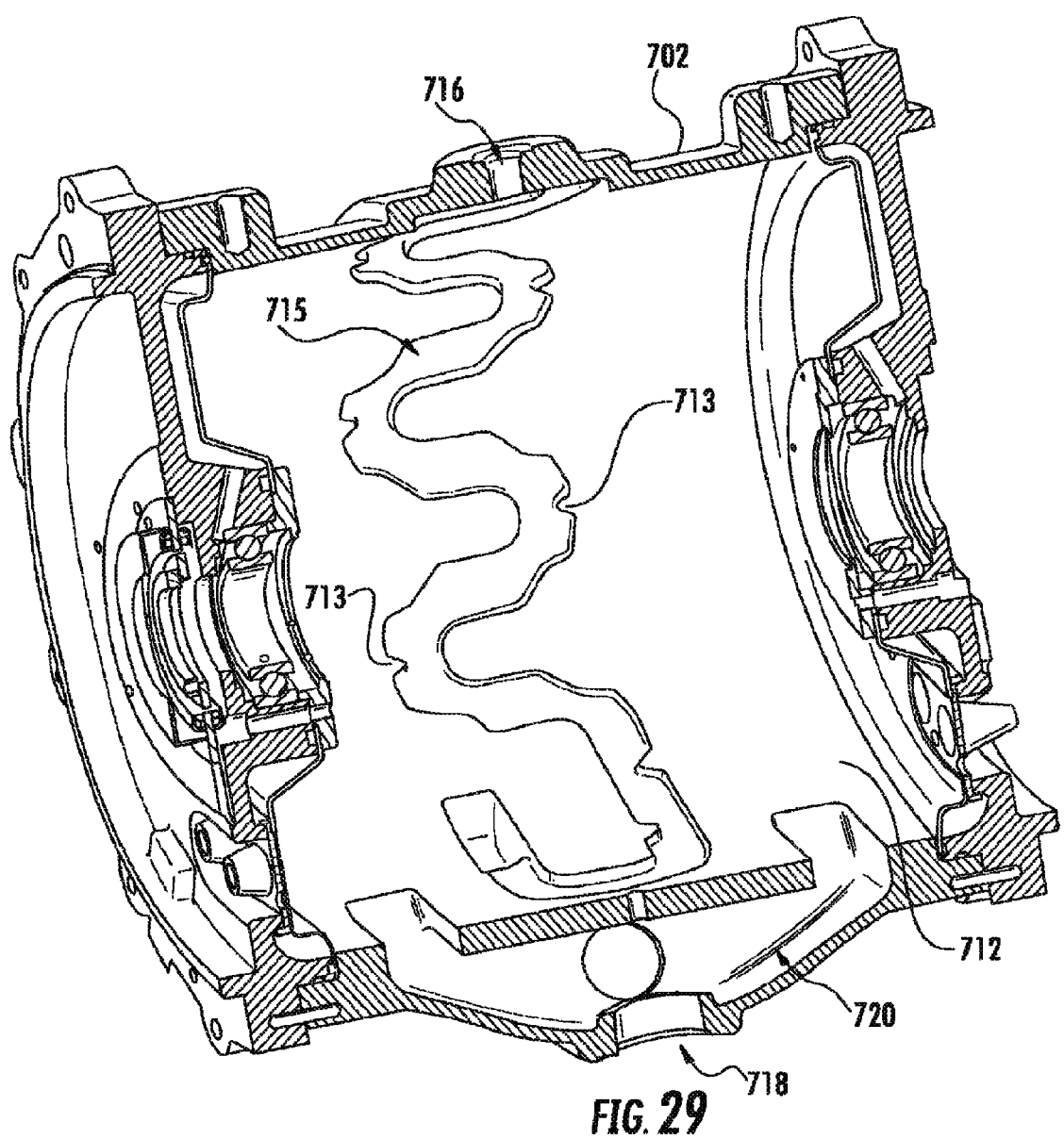
FIG. 29 is bottom rear isometric cutaway view of the example electric motor assembly of FIG. 27 with the rotor and shaft removed.
Figure 30:
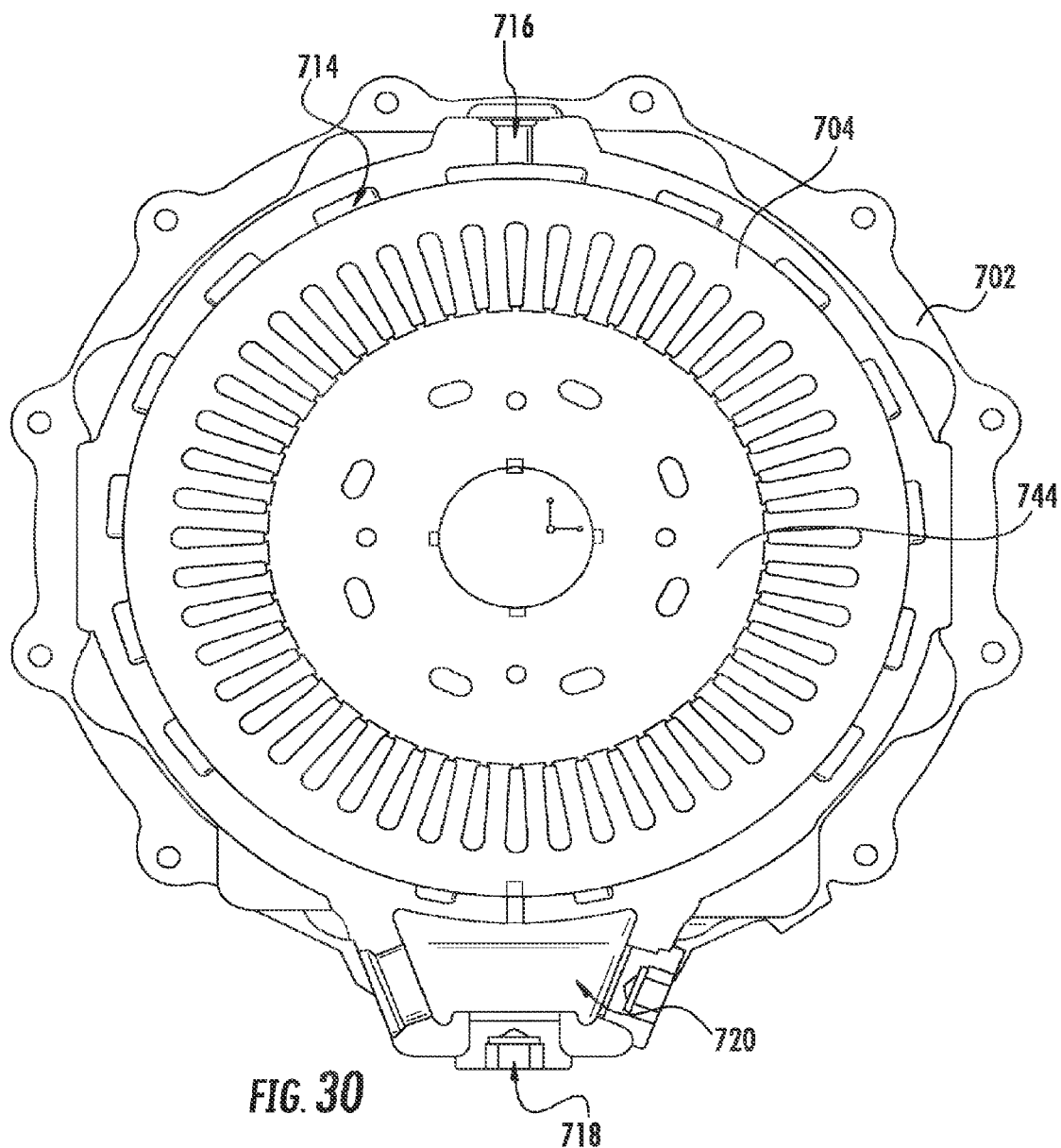
FIG. 30 is a cutaway end view of the example electric motor assembly of FIG. 27.
Figure 31:
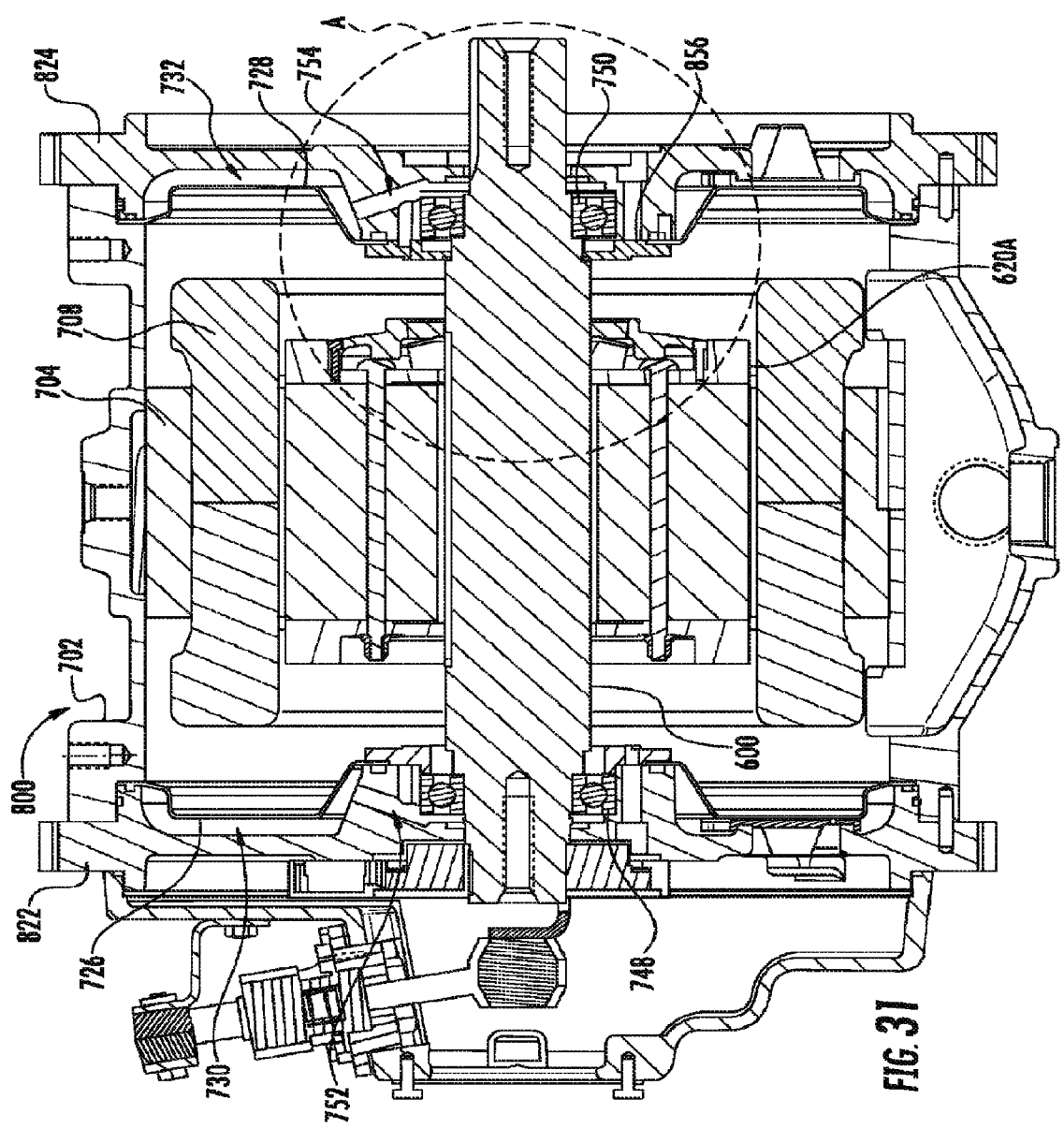
FIG. 31 is a cutaway side view of another example electric motor assembly according to aspects of the present disclosure.
Figure 32:
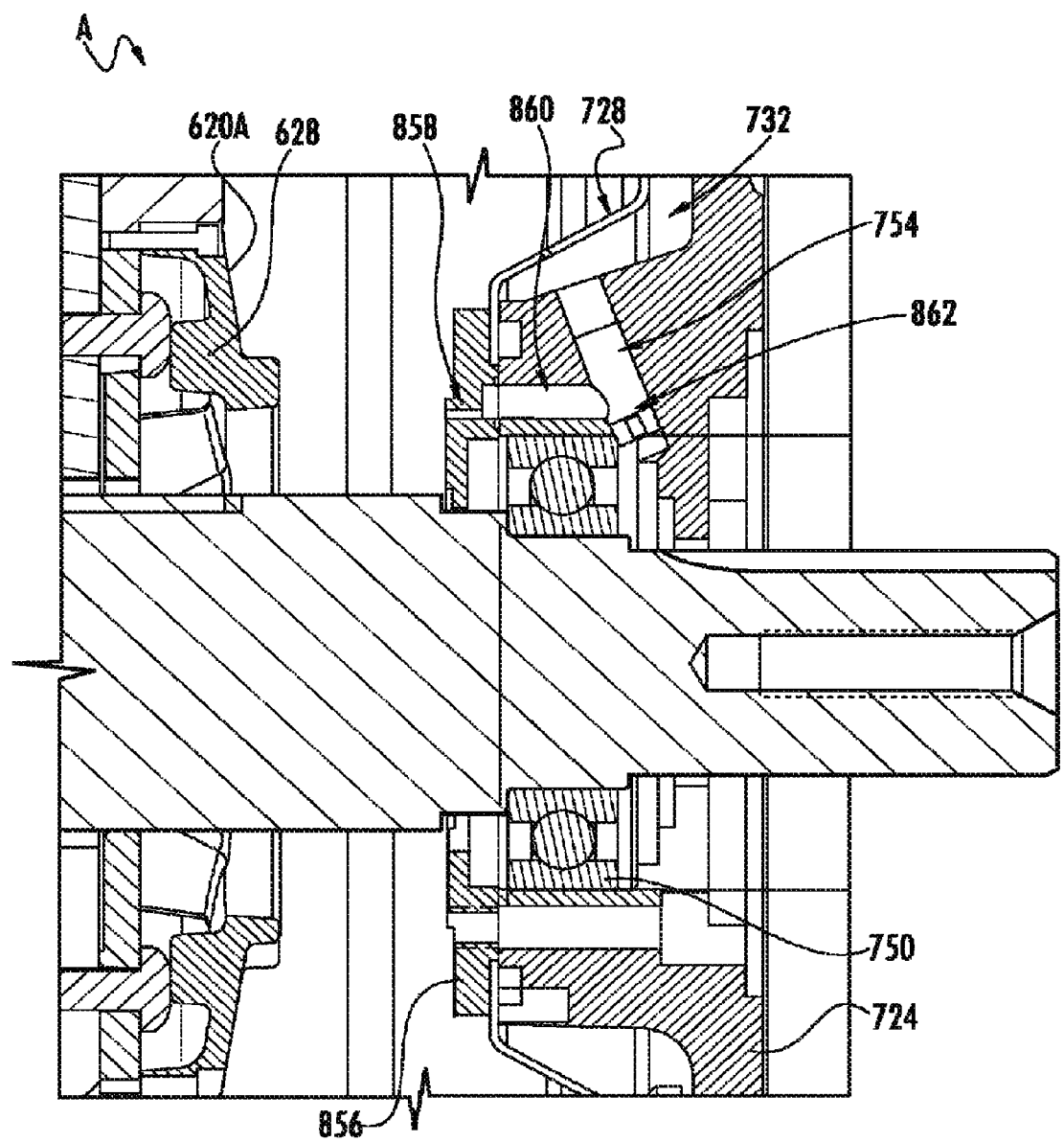
FIG. 32 is a close-up view of portion A of the example electric motor assembly of FIG. 31.

The housing 702 includes an inner surface 712 (best seen in FIGS. 28 and 29). The inner surface 712 encloses the stator 704. Although the illustrated inner surface 712 encloses all of the stator 704, the housing 702 may include an inner surface 712 that encloses less than all of the stator 704.

The inner surface 712 of the housing 702 engages (e.g., contacts, couples with, is connected to, etc.) the outer surface 710 of the stator core 706. A fluid passage 714 is cooperatively defined by the outer surface 710 of the stator core 706 and a recessed channel 715 in the inner surface 712 of the housing 702. The fluid passage 714 permits a coolant (not illustrated) in the fluid passage 714 to contact portions of the outer surface 710 of the stator core 706 to remove heat from the stator core 706 during operation of the electric motor assembly 700.

The coolant may be any suitable fluid for transferring heat. The coolant may be, for example, oil, air, a mixture of oil and air, etc.

The illustrated recessed channel 715, and accordingly the fluid passage 714, is generally S-shaped and traverses circumferentially and axially around at least part of the housing 702 along a central portion of the stator core 706. The fluid passage 714 may traverse around the entire circumference of the housing 702, or may traverse less than the entire circumference of the housing 702. Additionally, the fluid passage 714 may be oriented along the length of the housing 702 (e.g. substantially perpendicular to the illustrated recessed channel 715). The fluid passage 714 may be located offset from a central portion of the stator core 706. Alternatively, or additionally, the fluid passage 714 may traverse the housing 702 both circumferentially and lengthwise, with no particular direction (e.g., random, meandering, etc.), etc. Additionally, the fluid passage 714 may have any suitable shape and is not limited to the particular shape shown in FIG. 28. The fluid passage 714 may be symmetrical, asymmetrical, a combination of symmetrical and asymmetrical, etc. Additionally, or alternatively, the assembly 700 may include more than one fluid passage 714. For example, there may be a fluid passage 714 on each half of the housing 702 (e.g., around opposite sides of the stator core 706).

The fluid passage 714 includes several flow disruptors 713. The flow disruptors 713 project into the fluid passage 714 from an edge of the recessed channel 715. Thus, each flow disruptor 713 changes the cross sectional area of the fluid passage 714 in the area where the flow disruptor 713 is located. The flow disruptors 713 also interrupt the smooth path through the passage 714 that the coolant would otherwise take. Hence, the flow disruptors 713 disturb the flow of coolant through the fluid passage 714 and generate turbulence in the coolant. This turbulence may cause the coolant to mix or stir within the fluid passage 714. The mixing or stirring of the coolant increases a heat transfer coefficient of the coolant adjacent the flow disruptors 713 within the fluid passage 714 and therefore permits greater transfer of heat from the stator core 706 to the coolant. This may result in better thermal transfer from the stator to the coolant.

The flow disruptors 713 are located in portions of the fluid passage 714 that are likely to have a low heat transfer coefficient (e.g., U bends or straight passages in the fluid passage 714) and therefore adjacent to areas of the stator core 706 that may have higher temperatures than other portions of the stator core 706. Thus, areas of the stator core 706 that are likely to have higher temperatures may have additional heat transferred to the coolant due to the presence of the flow disruptors 713. Alternatively, or additionally, the flow disruptors 713 may be positioned in any other portion of the fluid passage to generally increase the heat transfer from the stator core 706 to the coolant.

The illustrated flow disruptors 713 are generally triangular shaped flow disruptors 713 extending from an edge of the recessed channel 715 into the fluid passage 714 and extending from the bottom of the recessed channel 715 to about the inner surface 712 of the housing 702. The flow disruptors 713 may have any other suitable shape, including, for example, rectangular, square, semicircular, ellipsoid, etc. The size of the flow disruptors may also be any suitable size. The flow disruptors 713 may, for example, extend a greater or lesser distance into the fluid passage, may not extend completely to the inner surface 712 and/or the bottom of the recessed channel 715, etc. Furthermore, the flow disruptors 713 need not all be the same shape or have the same size. The flow disruptors 713 may have different sizes and shapes as desired to produce different affects on the flow of coolant through the fluid passage 714.

The stator 704 is a laminated stator. The stator core 706 is constructed of a plurality of stator laminations (not separately illustrated) laminated together. The stator laminations have outer edges (which cooperatively form at least part of the outer surface 710 of the stator core 706). The fluid passage 714 is configured to permit coolant in the fluid passage 714 to contact the outer edges of the stator laminations.

The assembly 700 includes a fluid inlet 716 in fluid communication with the fluid passage 714. The assembly 700 also includes a fluid outlet 718 in fluid communication with the fluid passage 714. A fluid collection area 720 is located adjacent the fluid outlet 718. The fluid outlet 718 and the fluid collection area 720 are located below the stator 704.

During operation of the electric motor assembly 700, coolant enters the assembly through the fluid inlet 716 and flows through the fluid passage 714 toward the fluid outlet 718. While flowing in the fluid passage 714, the coolant is in direct contact with the outer surface 710 of the stator core 706. More particularly, the coolant is in direct contact with the stator laminations. Heat is transferred by this contact from the stator core 706 to the coolant. Generally, the coolant exits the fluid passage 714 through the fluid outlet 718. Some of the coolant may be directed elsewhere in the assembly 700 instead of exiting the fluid outlet 718, as will be discussed below. The coolant that exits the fluid outlet 718 is returned to the fluid inlet 716. During the recirculation to the fluid inlet 716, the coolant may be processed with at least one heat exchanger to release at least some of the heat the coolant received from the stator core 706. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

The assembly 700 includes a first end shield 722 and a second end shield 724. A first wall 726 is positioned between the first end shield 722 and the stator 704. A second wall 728 is positioned between the second end shield 724 and the stator 704. The first wall 726 and the first end shield 722 cooperatively define a first fluid chamber 730 and the second wall 728 and the second end shield 724 cooperatively define a second fluid chamber 732. Each of the first and second walls 726, 728 includes a plurality of orifices (e.g., holes, slots, openings, etc.). Although not illustrated in FIGS. 27-30, the walls 726, 728 may include more or fewer orifices (with similar or different configurations) than the walls 126, 128 and orifices 134 illustrated in the example of FIG. 8.

In operation of the assembly 700, coolant flows into the first and second fluid chambers 730, 732 and through the orifices. The orifices are configured (e.g., shaped, sized, aimed, etc.) to direct the coolant onto the end turns 708 of the stator 704 to remove heat from the end turns 708. The orifices may be configured to spray coolant on an outer side 736 of the end turns 708, on an inner side 738 of the end turns 708, and/or on a face 740 of the end turns 708.

The coolant to be sprayed by the orifices is some of the same coolant that flows through the fluid passage 714. As discussed above, coolant flows through the fluid passage 714 toward the fluid outlet 718. Most of the coolant exits the fluid passage 714 through the fluid collection area 720 and the fluid outlet 718. Some or all of the coolant, however, is diverted into a transfer port 742 located near the fluid outlet 718. The transfer port 742 is in fluid communication with at least one of the fluid chambers 730, 732. For example, the transfer port 742 illustrated in FIG. 28 transfers coolant to the first fluid chamber 730. A similar transfer port 742 on the other half of the housing 702 will provide coolant to the second fluid chamber 732. Alternatively, a single transfer port (and/or more than two transfer ports) may provide coolant to both fluid chambers 730, 732. Similarly, more than one transfer port may provide coolant to a single fluid chamber 730, 732. Alternatively, or additionally, coolant may be provided to the first and second fluid chambers 730, 732 separately from the coolant in the fluid passage 714.

Coolant sprayed onto the end turns 708 drips, splashes, etc. off the end turns 708 and is collected by drainage ports 743. The drainage ports 743 direct the coolant into the fluid collection area 720. Alternatively, or additionally, coolant sprayed by the orifices may be collected separately from coolant passed through the fluid passage 714.

The coolant is forcefully circulated through the assembly 700 (and more particularly, through the fluid passage 714, transfer port 742, etc.) using pressure. The pressure and speed of the coolant may be varied to achieve desired cooling, desired spray from the orifices, etc. Alternatively, or additionally, the coolant may be circulated by any other suitable means (including, e.g., by gravity).

The cooling features discussed above are generally directed to cooling the stator 704. The assembly 700 may also include features generally directed to cooling a rotor 744. For example, the rotor 744 includes a fluid passage 746 extending through part of the rotor 744. Coolant may travel through the fluid passage 746 to contact one or more portions of the rotor 744 to remove heat from the rotor 744 during operation of the assembly 700. Other suitable rotors, including rotors without a fluid passage 746, rotors according to other embodiments discussed herein, etc., may be used in the assembly 700 without departing from the scope of this disclosure.

The assembly 700 includes first and second bearings 748, 750. The first end shield 722 includes a first fluid passage 752 connected in fluid communication with the first fluid chamber 730 for supplying coolant to the first bearing 748 to remove heat from the first bearing 748 and lubricate the first bearing 748. The second end shield 724 includes a second fluid passage 754 connected in fluid communication with the second fluid chamber 732 for supplying coolant to the second bearing 750 to remove heat from the second bearing 750 and lubricate the second bearing 750.

Another example electric motor assembly 800, according to one or more aspects of the present disclosure will be described with reference to FIGS. 31-35.

The assembly 800 includes the housing 702 and stator 704 described above with reference to FIGS. 27-30. The assembly includes the rotor assembly 600 described above with reference to FIGS. 20-26.

The assembly 800 includes a first end shield 822 and a second end shield 824. The first wall 726 is positioned between the first end shield 822 and the stator 704. The second wall 728 is positioned between the second end shield 824 and the stator 704. The first wall 726 and the first end shield 822 cooperatively define the first fluid chamber 730 and the second wall 728 and the second end shield 824 cooperatively define the second fluid chamber 732. Each of the first and second walls 726, 728 includes the plurality of orifices (e.g., holes, slots, openings, etc.) for directing coolant from the fluid chambers 730, 732 to the end turns 708 of the stator 704.

The assembly 800 includes the first and second bearings 748, 750. The first fluid passage 752 is connected in fluid communication with the first fluid chamber 730 for supplying coolant to the first bearing 748 to remove heat from the first bearing 748 and lubricate the first bearing 748. The second fluid passage 754 connected in fluid communication with the second fluid chamber 732 for supplying coolant to the second bearing 750 to remove heat from the second bearing 750 and lubricate the second bearing 750.

Figure 33:
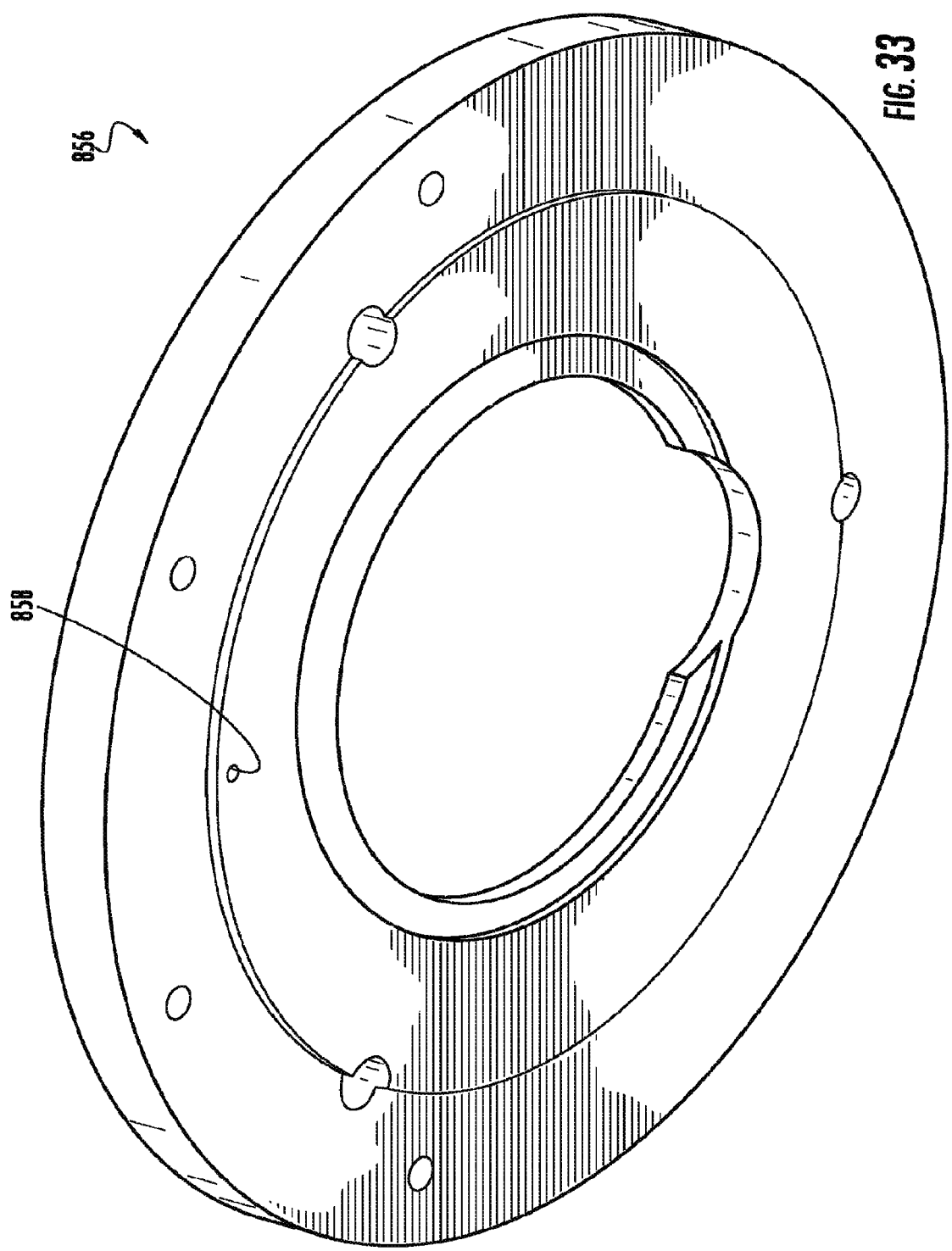
FIG. 33 is a top isometric view of a bearing cap of the example electric motor assembly of FIG. 31.
Figure 34:
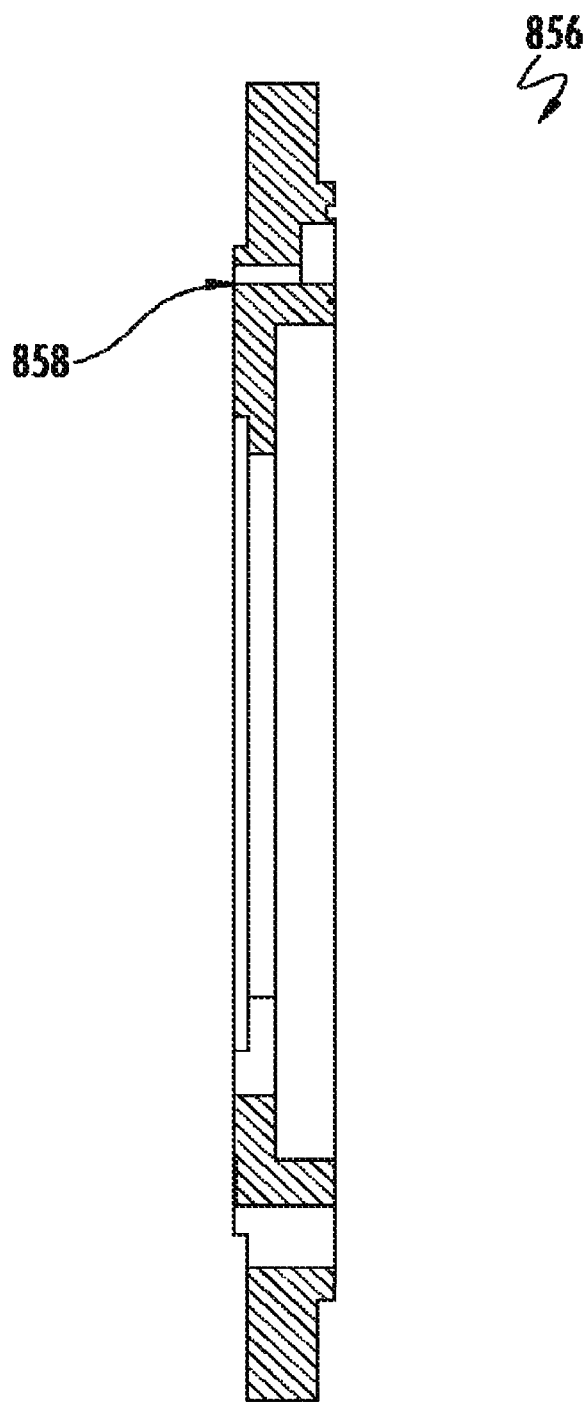
FIG. 34 is a cutaway side view of the bearing cap of FIG. 33.
Figure 35:
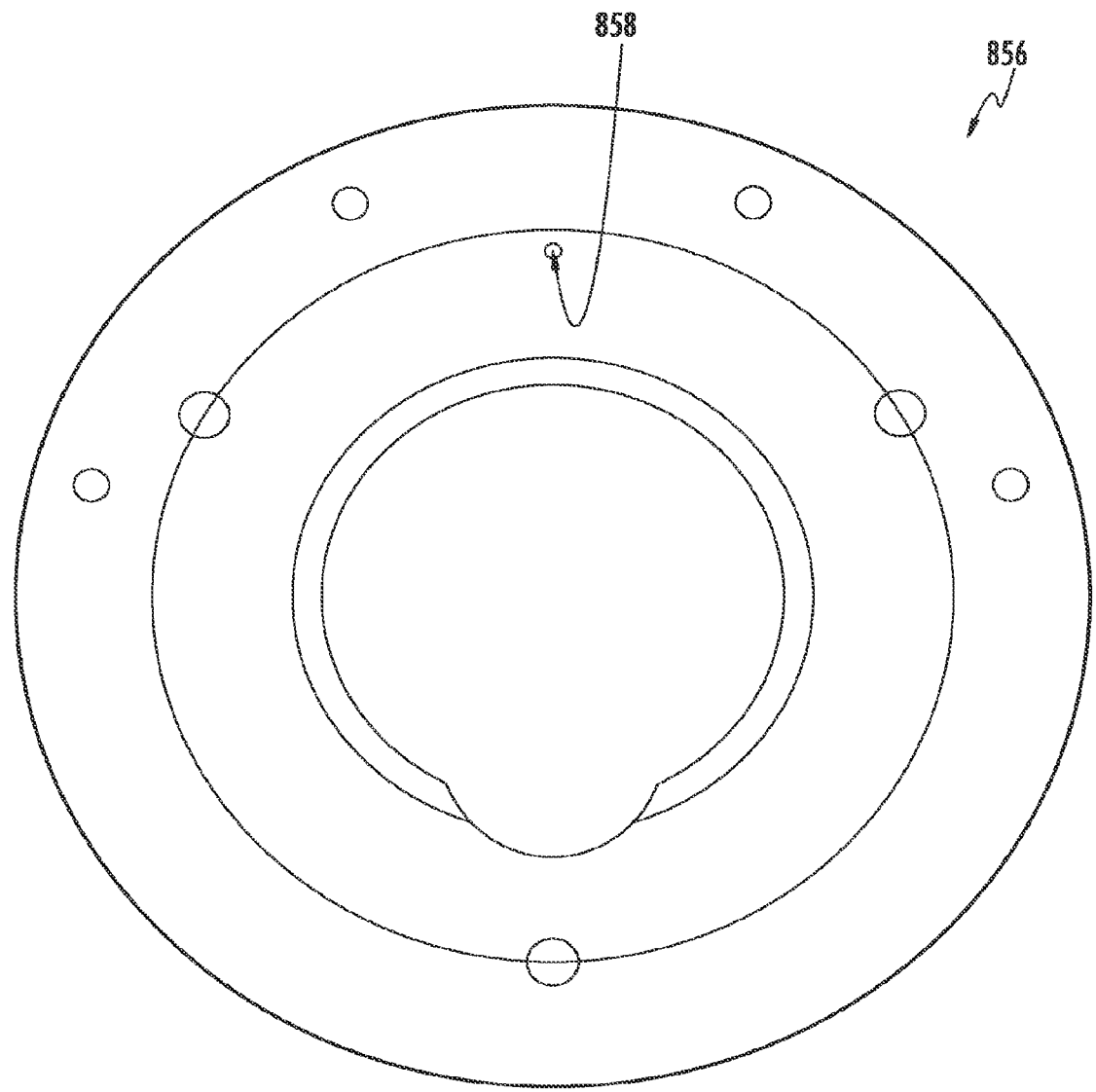
FIG. 35 is a top plan view of the bearing cap of FIG. 33.

The assembly 800 includes a bearing cap 856 attached to the second end shield 824 adjacent the second bearing 750. The bearing cap 856 includes at least one orifice 858 (e.g., hole, slot, opening, etc.). A cap fluid passage 860 is connected in fluid communication with the second fluid chamber 732 (via the second fluid passage 754) and the bearing cap orifice 858. A plug 862, possibly including an orifice, may be inserted into the second fluid passage 754 to redirect some or all of the coolant in the second fluid passage 754 to the cap fluid passage 860. Thus, coolant may flow from the second fluid chamber 732 to the bearing cap orifice 858. The bearing cap orifice 858 is configured (e.g., shaped, sized, aimed, etc.) to direct the coolant at the rotor 602. The bearing cap 856 may include more or fewer orifices 858, including no orifice 858, than is illustrated in FIGS. 33 and 35 and/or the configuration of orifice 858 may differ. Further, in other embodiments, coolant may be directed at the rotor 602 without employing or directing coolant through the bear cap 856 (e.g., the orifice 858 may be formed through a different component, or other means may be employed for directing coolant to the rotor).

More specifically, the orifice 858 directs the coolant toward the end plate 620A of the rotor 602. As described above, the end plate 620A includes the impeller 628 (e.g., fan, impeller, etc.) and the fluid port 630 in fluid communication with fluid passageways 626 through the rotor 602. When the shaft 604 and the endplate 620A are rotated, the impeller 628 draws coolant (including the coolant directed at the end plate 620A by the orifice 858) into the fluid port 630 and through the fluid passageways 626 through the rotor 602 to remove heat from the rotor 602. The coolant may include any suitable coolant, including, for example, oil, air, oil and air, etc.

Another example electric motor assembly 900, according to one or more aspects of the present disclosure will be described with reference to FIGS. 36-39.

The assembly 900 includes a housing 902 and a stator 904. The stator 904 includes a stator core 906 with windings having end turns 908 around the stator core 906. The stator core includes an outer surface 910. In this particular example, the assembly 900 is a switched reluctance motor assembly.

Figure 37:
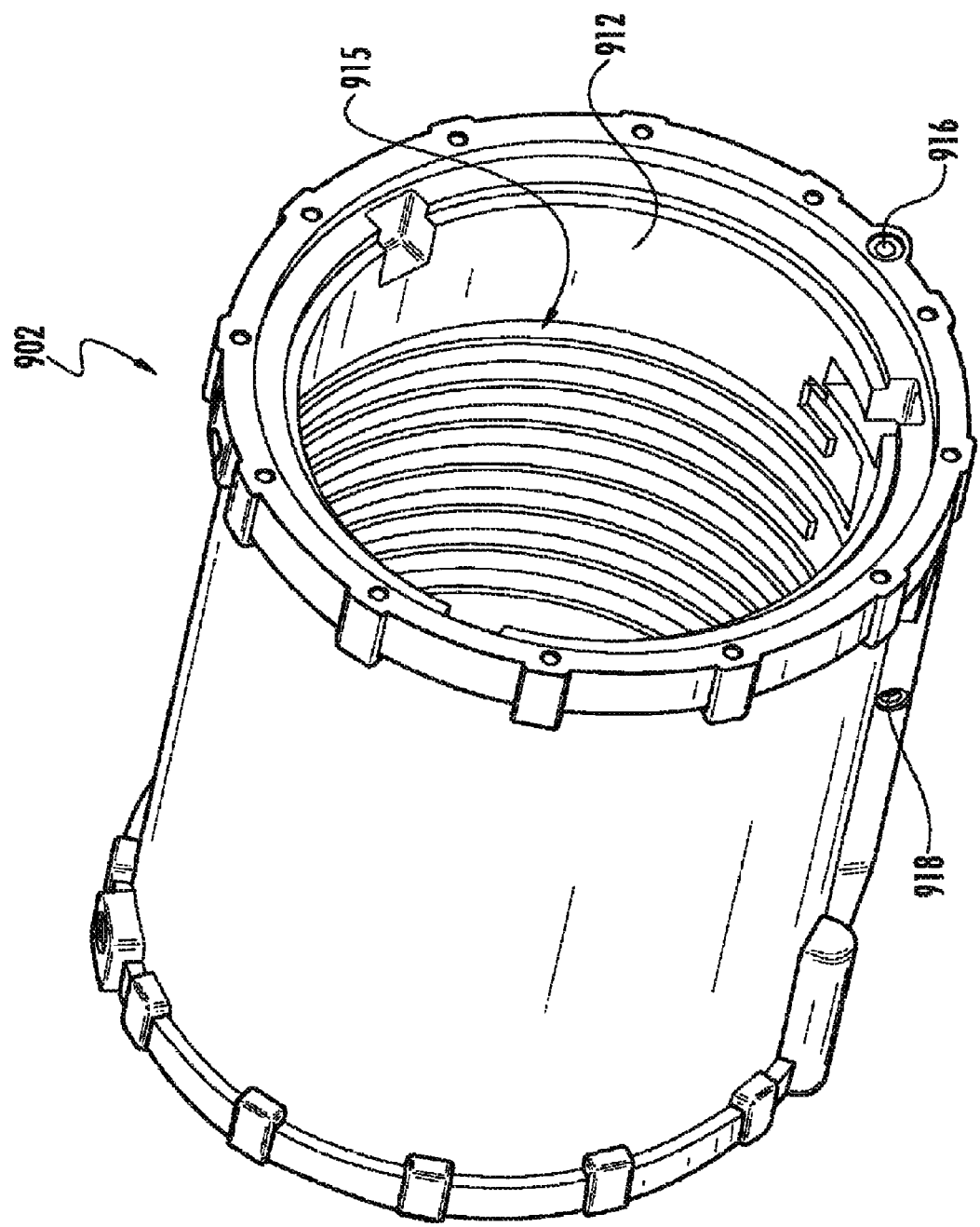
FIG. 37 is a top right isometric view of a housing of the electric motor assembly of FIG. 36.

The housing 902 includes an inner surface 912 (best seen in FIGS. 37 and 38). The inner surface 912 encloses the stator 904. Although the illustrated inner surface 912 encloses all of the stator 904, the housing 902 may include an inner surface 912 that encloses less than all of the stator 904.

The inner surface 912 of the housing 902 engages (e.g., contacts, couples with, is connected to, etc.) the outer surface 910 of the stator core 906. A fluid passage 914 is cooperatively defined by the outer surface 910 of the stator core 906 and a recessed channel 915 in the inner surface 912 of the housing 902. The fluid passage 914 permits a coolant (not illustrated) in the fluid passage 914 to contact portions of the outer surface 910 of the stator core 906 to remove heat from the stator core 906 during operation of the electric motor assembly 900.

The coolant may be any suitable fluid (i.e., a liquid or gas) for transferring heat. The coolant may be, for example, oil, air, a mixture of oil and air, etc.

The illustrated recessed channel 915, and accordingly the fluid passage 914, traverses along a central portion of the stator core 906. The fluid passage 914 may traverse around the entire circumference of the housing 902, or may traverse less than the entire circumference of the housing 902.

As best shown in FIG. 38, the fluid passage 915 is configured to direct coolant in a first circumferential direction (e.g., counter-clockwise) around the housing (and thus around the stator) before reversing directions to direct the coolant in a second circumferential direction (e.g., clockwise). Thus, the direction of coolant flow alternates back and forth along the length of the housing (and stator).

Additionally, the fluid passage 914 may traverse the entire length of the housing 902 or may traverse less than the entire length of the housing 902. The fluid passage 914 may be oriented along the substantially perpendicular to the illustrated recessed channel 915. The fluid passage 914 may be located offset from a central portion of the stator core 906. Alternatively, or additionally, the fluid passage 914 may traverse the housing both circumferentially and lengthwise, with no particular direction (e.g., random, meandering, etc.), etc. Additionally, the fluid passage 914 may have any suitable shape and is not limited to the illustrated shape. The fluid passage 914 may be symmetrical, asymmetrical, a combination of symmetrical and asymmetrical, etc. Additionally, or alternatively, the assembly 900 may include more than one fluid passage 914. For example, there may be a fluid passage 914 on each half of the housing 902 (e.g., around opposite sides of the stator core 906).

The stator 904 is a laminated stator. The stator core 906 is constructed of a plurality of stator laminations (not separately illustrated) laminated together. The stator laminations have outer edges (which cooperatively form at least part of the outer surface 910 of the stator core 906). The fluid passage 914 is configured to permit coolant in the fluid passage 914 to contact the outer edges of the stator laminations.

The assembly 900 includes a fluid inlet 916 in fluid communication with the fluid passage 914. The assembly 900 also includes a fluid outlet 918 in fluid communication with the fluid passage 914. The fluid outlet 918 is located below the stator 904.

During operation of the electric motor assembly 900, coolant enters the assembly through the fluid inlet 916 and flows through the fluid passage 914 toward the fluid outlet 918. While flowing in the fluid passage 914, the coolant is in direct contact with the outer surface 910 of the stator core 906. More particularly, the coolant is in direct contact with the stator laminations. Heat is transferred by this contact from the stator core 906 to the coolant. Generally, the coolant exits the fluid passage 914 through the fluid outlet 918. Some of the coolant may be directed elsewhere in the assembly 900 instead of exiting the fluid outlet 918, as will be discussed below. The coolant that exits the fluid outlet 918 is returned to the fluid inlet 916. During the recirculation to the fluid inlet 916, the coolant may be processed with at least one heat exchanger to release at least some of the heat the coolant received from the stator core 906. Any suitable process for lowering the temperature of the coolant by allowing the coolant to release heat may be used. For example, the coolant may be cooled using a radiator, a fan, thermally conductive tubing, a heat sink, a combination of such cooling techniques, etc.

The assembly 900 includes a first end shield 922 and a second end shield 924. A first wall 926 is positioned between the first end shield 922 and the stator 904. A second wall 928 is positioned between the second end shield 924 and the stator 904. The first wall 926 and the first end shield 922 cooperatively define a first fluid chamber 930 and the second wall 928 and the second end shield 924 cooperatively define a second fluid chamber 932. The first and second walls 926, 928 include a plurality of orifices (e.g., holes, slots, openings, etc.). Although not illustrated in FIGS. 36-39, the orifices may be similar to the orifices 134 in FIG. 8.

In operation of the assembly 900, coolant flows into the first and second fluid chambers 930, 932 and through the orifices. The orifices are configured (e.g., shaped, sized, aimed, etc.) to direct the coolant onto the end turns 908 of the stator 904 to remove heat from the end turns 908. The orifices may be configured to spray coolant on an outer side of the end turns 908, on an inner side of the end turns 908, and/or on a face of the end turns 908.

The coolant to be sprayed by the orifices is some of the same coolant that flows through the fluid passage 914. For example, FIG. 39 illustrates a cross section of a portion of the end shield 922 showing the fluid inlet 916 that provides coolant to both the fluid passage 914 and the first fluid chamber 930 (via a fluid passage 964). Some of the coolant that passes through the fluid passage 914 is diverted to the second fluid chamber 932. The coolant in the first and second fluid chambers 930, 932 is sprayed by the orifices toward the end turns 908 of the stator 904.

Coolant sprayed onto the end turns 908 drips, splashes, etc. off the end turns 908 and is collected by drainage ports. The drainage ports direct the coolant to the fluid outlet 918.

The coolant is forcefully circulated through the assembly 900 (and more particularly, through the fluid passage 914, etc.) using pressure. The pressure and speed of the coolant may be varied to achieve desired cooling, desired spray from the orifices, etc. Alternatively, or additionally, the coolant may be circulated by any other suitable means (including, e.g., by gravity).

Figure 36:
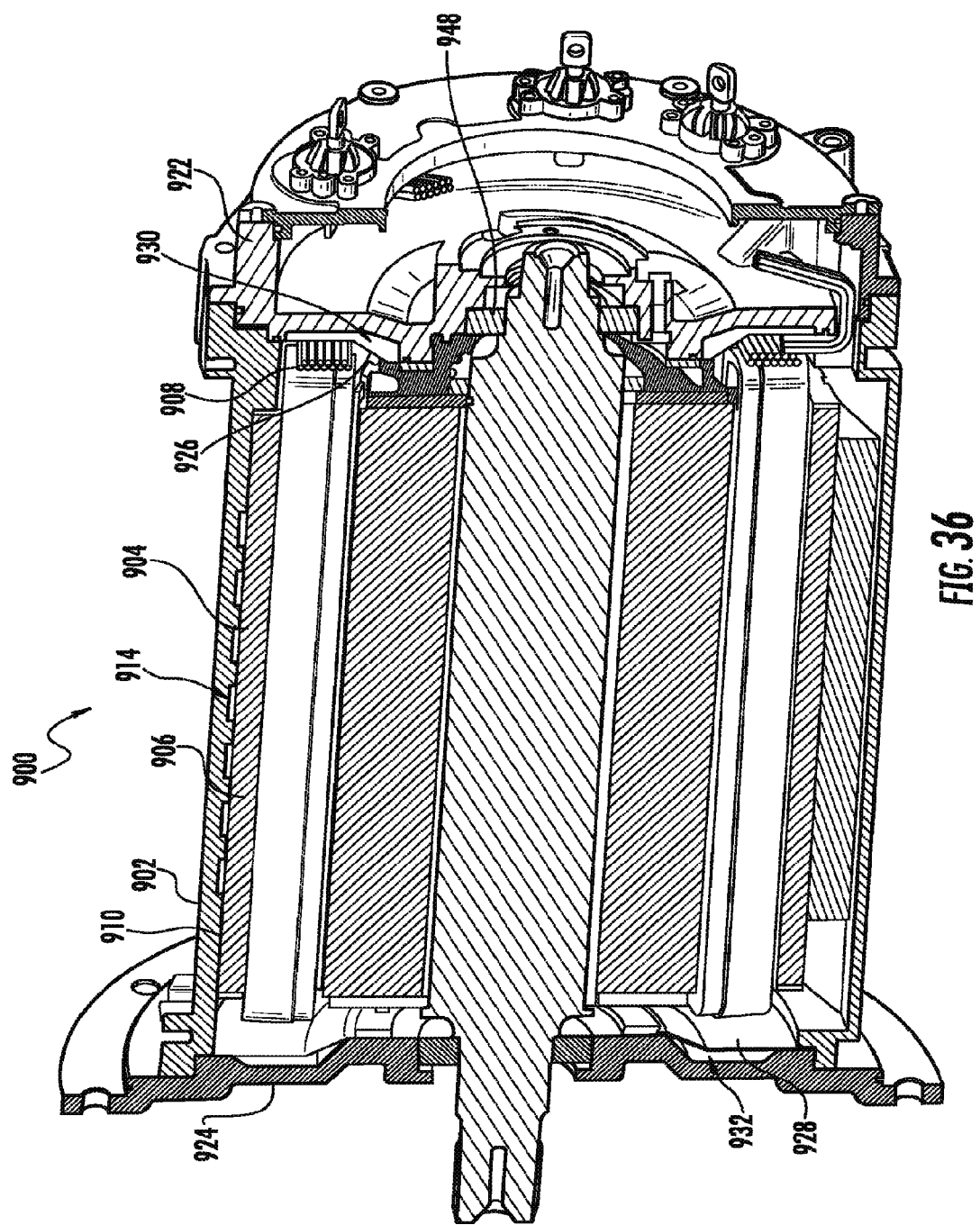
FIG. 36 is a cutaway right isometric view of another example electric motor assembly according to aspects of the present disclosure.

The cooling features discussed above are generally directed to cooling the stator 904. The assembly 900 may also include features generally directed to cooling and lubricating bearings. As shown in FIG. 36, the assembly 900 includes a bearing 948. As shown in FIG. 39, the first end shield 922 includes a first fluid passage 952 connected in fluid communication with the first fluid chamber 930 for supplying coolant to the bearing 948 to remove heat from the bearing 948 and lubricate the bearing 948.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. An electric motor assembly capable of being cooled with a coolant, said motor assembly comprising:
    a rotor rotatable about an axis;
    a stator including a stator core and windings wound about the stator core,
    said stator core including opposite first and second ends spaced along the axis,
    said stator core presenting an outer surface extending between the ends,
    said windings including end turns positioned at the first end of the stator core;
    a housing enclosing at least a portion of the stator,
    said housing including an inner surface that cooperates with the outer surface of the stator core to define a stator cooling passage through which coolant flows to remove heat from the stator core during operation of the assembly; and
    at least one orifice for directing coolant onto the end turns for removing heat from the end turns during operation of the assembly,
    said at least one orifice being in fluid communication with the stator-cooling passage,
    said windings including a second set of end turns positioned at the second end of the stator core,
    said housing inner surface cooperating with the outer surface of the stator core to define a second stator-cooling passage through which coolant flows to remove heat from the stator core during operation of the assembly,
    said assembly defining at least one second orifice for directing coolant onto the second end turns for removing heat from the second end turns during operation of the assembly,
    said at least one second orifice being in fluid communication with the second stator-cooling passage.

2. The electric motor assembly as claimed in claim 1,
    said stator-cooling passage and said second stator cooling passage each at least in part circumscribing the core,
    said stator-cooling passage and said second stator cooling passage extending in generally opposite circumferential directions.

3. The electric motor assembly as claimed in claim 1,
    said stator-cooling passage including a plurality of fluidly interconnected, at least substantially S-shaped portions.

4. The electric motor assembly as claimed in claim 1,
    said stator-cooling passage directing coolant in alternating first and second circumferential directions,
    said first circumferential direction being opposite the second circumferential direction.

5. The electric motor assembly as claimed in claim 1,
    said stator-cooling passage at least in part circumscribing the core.

6. The electric motor assembly as claimed in claim 1,
    said end turns presenting a radially outer side,
    said at least one orifice directing coolant onto the radially outer side.

7. The electric motor assembly as claimed in claim 1,
    said at least one orifice configured to be downstream of the stator-cooling passage, such that coolant first flows through the stator-cooling passage to remove heat from the stator core and is then directed through the at least one orifice to remove heat from the end turns.

8. The electric motor assembly as claimed in claim 7,
    said assembly including a chamber extending between and fluidly interconnecting the stator-cooling passage and the at least one orifice.

9. The electric motor assembly as claimed in claim 8,
    said chamber extending generally circumferentially.

10. The electric motor assembly as claimed in claim 9,
    said chamber being generally toroidal.

11. The electric motor assembly as claimed in claim 8,
    said housing at least in part defining the chamber.

12. The electric motor assembly as claimed in claim 11,
    said chamber in part defined by a wall-like structure positioned between the housing and the stator,
    said wall-like structure defining the at least one orifice.

13. The electric motor assembly as claimed in claim 12,
    said housing including a recessed portion in part constituting the chamber,
    said wall-like structure at least substantially enclosing the recessed portion of the housing.

14. The electric motor assembly as claimed in claim 13,
    said wall-like structure being positioned between the housing and the first end of the stator.

15. The electric motor assembly as claimed in claim 14,
    said housing having an axial end,
    said wall-like structure being positioned axially between the axial end of the housing and the first end of the stator.

16. The electric motor assembly as claimed in claim 13,
    said housing including an endshield defining the recessed portion.

17. The electric motor assembly as claimed in claim 12,
    said assembly including a plurality of said orifices for directing coolant onto the end turns during operation of the assembly,
    said wall-like structure defining the orifices.

18. The electric motor assembly as claimed in claim 17,
    said orifices being arcuately spaced apart.

19. The electric motor assembly as claimed in claim 17,
    said wall-like structure being contoured to direct coolant via the orifices onto different portions of the end turns.

20. The electric motor assembly as claimed in claim 8,
    said assembly including a transfer port extending between and fluidly interconnecting the stator-cooling passage and the chamber,
    said stator-cooling passage, said transfer port, and said chamber configured such that coolant is directed exclusively from the stator-cooling passage to the transfer port and exclusively from the transfer port to the chamber.

21. The electric motor assembly as claimed in claim 20,
    said housing defining the transfer port.

22. The electric motor assembly as claimed in claim 8,
    said assembly including an inlet, a fluid collection area, and an outlet,
    said inlet, said stator-cooling passage, said at least one orifice, said fluid collection area, and said outlet being sequentially fluidly interconnected and configured such that coolant flows from the inlet into the stator-cooling passage and thereafter to the at least one orifice, is directed onto the end turns via the at least one orifice and thereafter collects in the fluid collection area, and drains from the fluid collection area to and through the outlet.

23. The electric motor assembly as claimed in claim 1, said housing inner surface defining a recessed channel that at least in part constitutes the stator-cooling passage.

* * * * *